United States Patent
Liu et al.

(10) Patent No.: US 9,529,426 B2
(45) Date of Patent: Dec. 27, 2016

(54) HEAD POSE TRACKING USING A DEPTH CAMERA

(75) Inventors: Zicheng Liu, Bellevue, WA (US); Zhengyou Zhang, Bellevue, WA (US); Zhenning Li, Waterloo (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 585 days.

(21) Appl. No.: 13/369,168

(22) Filed: Feb. 8, 2012

(65) Prior Publication Data

US 2013/0201291 A1 Aug. 8, 2013

(51) Int. Cl.
  H04N 13/02 (2006.01)
  G06F 3/01 (2006.01)
  G06T 7/00 (2006.01)

(52) U.S. Cl.
  CPC ............. G06F 3/012 (2013.01); G06T 7/0044 (2013.01); G06T 2207/10028 (2013.01); G06T 2207/30244 (2013.01)

(58) Field of Classification Search
  CPC ................................ G06F 3/012; H04N 13/02
  USPC ........................................................ 348/47
  See application file for complete search history.

(56) References Cited

U.S. PATENT DOCUMENTS

| | | | |
|---|---|---|---|
| 6,064,749 A | 5/2000 | Hirota et al. | |
| 6,094,501 A | 7/2000 | Beatty | |
| 7,002,551 B2 | 2/2006 | Azuma et al. | |
| 8,831,277 B1* | 9/2014 | Hoke et al. | 382/103 |
| 2002/0105484 A1* | 8/2002 | Navab | G02B 27/017 345/8 |
| 2003/0020842 A1* | 1/2003 | Lasko-Harvill et al. | 349/1 |
| 2003/0235341 A1* | 12/2003 | Gokturk et al. | 382/243 |
| 2005/0256675 A1 | 11/2005 | Kurata | |
| 2007/0035562 A1 | 2/2007 | Azuma et al. | |
| 2008/0002262 A1* | 1/2008 | Chirieleison | 359/630 |

(Continued)

FOREIGN PATENT DOCUMENTS

CN 102016877 A 4/2011

OTHER PUBLICATIONS

Hol, J. D., T. B. Schon, F. Gustafsson, P. J. Slycke, Sensor fusion for augmented reality, 9th Int'l Conf. on Information Fusion, Jul. 2006, pp. 1-6.

(Continued)

*Primary Examiner* — Dave Czekaj
*Assistant Examiner* — Berteau Joisil
(74) *Attorney, Agent, or Firm* — Steve Wight; Sandy Swain; Micky Minhas

(57) ABSTRACT

Head pose tracking technique embodiments are presented that use a group of sensors configured so as to be disposed on a user's head. This group of sensors includes a depth sensor apparatus used to identify the three dimensional locations of features within a scene, and at least one other type of sensor. Data output by each sensor in the group of sensors is periodically input, and each time the data is input it is used to compute a transformation matrix that when applied to a previously determined head pose location and orientation established when the first sensor data was input identifies a current head pose location and orientation. This transformation matrix is then applied to the previously determined head pose location and orientation to identify a current head pose location and orientation.

19 Claims, 13 Drawing Sheets

(56) References Cited

U.S. PATENT DOCUMENTS

| | | |
|---|---|---|
| 2008/0212836 A1 | 9/2008 | Fujimura |
| 2009/0122146 A1 | 5/2009 | Zalewski |
| 2010/0103196 A1 | 4/2010 | Kumar et al. |
| 2010/0149343 A1 | 6/2010 | Kim |
| 2010/0208057 A1 | 8/2010 | Meier et al. |
| 2010/0245387 A1* | 9/2010 | Bachelder ............ G06T 19/006 345/633 |
| 2011/0149043 A1 | 6/2011 | Koh |

OTHER PUBLICATIONS

You, S., U. Neumann, Fusion of vision and gyro tracking for robust augmented reality registration, Proc. IEEE Computer Society Virtual Reality 2001 Conf., Mar. 2001, pp. 71-78, Yokohama, Japan.

Foxlin, E., Inertial head-tracker sensor fusion by a complementary separate-bias Kalman filter, Proc. of the IEEE 1996 Virtual Reality Annual Int'l Symposium, Mar.-Apr. 1996, pp. 185-194, Santa Clara, CA, USA.

Azuma, R., B. Hoff, H. Neely, R. Sarfaty, A motion-stabilized outdoor augmented reality system, Proc. of the IEEE Comp. Society Virtual Reality Conf., Mar. 1999, pp. 252-259, Houston, Texas, USA.

You, S., U. Neumann, R. Azuma, Orientation tracking for outdoor augmented reality registration, IEEE Computer Graphics and Applications, Nov. 1999, vol. 19, No. 6, pp. 36-42.

"Office Action Issued in European Patent Application No. 13746595.1", Mailed Date: Sep. 18, 2015, 5 Pages.

"First Office Action and Search Report Issued in Chinese Patent Application No. 201380008735.2", Mailed Date: Sep. 25, 2015, 11 Pages.

"Supplementary Search Report Received for European Patent Application No. 13746595.1", Mailed Date: Aug. 24, 2015, 3 Pages.

Bleiweiss, et al., "Robust Head Pose Estimation by Fusing Time-of-Flight Depth and Color", In Proceeding of the IEEE International Workshop on Multimedia Signal Processing, Oct. 4, 2010, pp. 116-121.

Cai, et al., "Real Time Head Pose Tfacking from Multiple Cameras with a Generic Model", In IEEE Workshop on Analysis and Modeling of Faces and Gestures in Conjunction with CVPR, Jun. 2010, pp. 25-32.

"Second Office Action Issued in Chinese Patent Application No. 201380008735.2", Mailed Date: Apr. 6, 2016, 8 Pages.

* cited by examiner

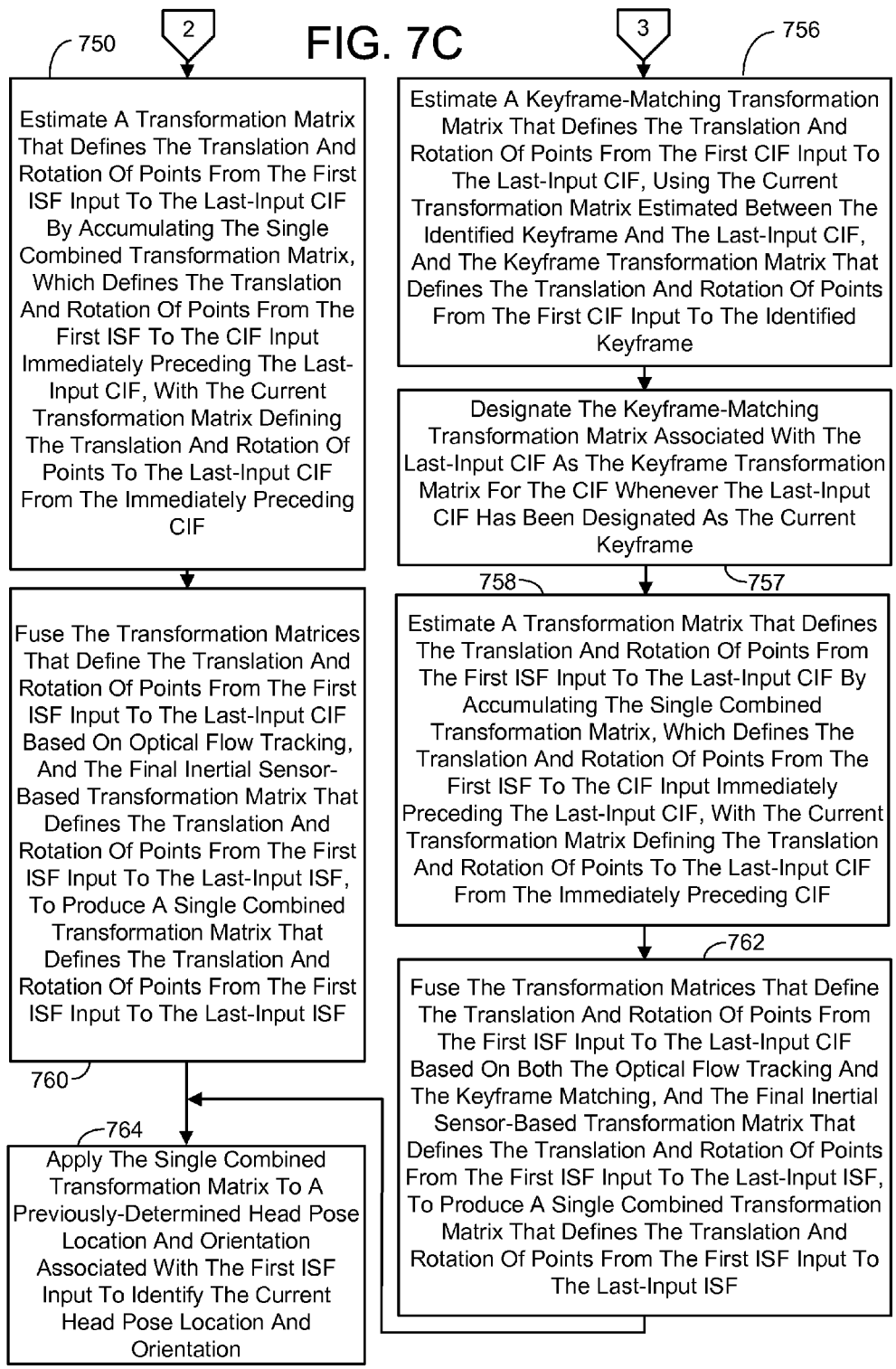

HEAD POSE TRACKING USING A DEPTH CAMERA

BACKGROUND

Head pose tracking typically involves periodically determining the location and orientation of a person's head within a space. The location of a person's head within a space is normally defined as a 3D location expressed in terms of a pre-established world coordinate system for the space. This location can, for example, be associated with the head centroid (i.e., the estimated center of the person's head). Although alternatively another readily ascertainable point associated with a person's head can be prescribed. Head pose orientation is usually defined in terms of rotation (pitch, roll, yaw) about three orthogonal axes having their common origin at the head centroid (or other prescribed head point). Typically, the pitch is the movement of the head up and down, the yaw is the movement of the head left and right, and the roll is the movement of the head from side to side.

Head pose is used in a variety of applications. For example, head pose is tracked in the context of an augmented reality application. In an augmented reality application, a user wears a goggle or similar device with at least one semi-transparent display so that the user can see both the real world and the virtual objects rendered onto the display. The virtual objects need to appear as if they were part of the real environment. One technical component in assuring that the virtual objects appear as if they are part of the environment is head pose tracking. When the user moves his or her head, the virtual objects, which are rendered on the display (that moves with the user's head), need to appear stationary with respect to the real environment.

One attempt at achieving accurate head pose tracking involves instrumenting the real environment, for example, by putting markers with known patterns at known locations of the wall or the ceiling. Images captured by a conventional video camera (which is mounted on a user's head or elsewhere in the space) are then processed using computer vision techniques to compute a user's head pose based on the location of the markers in the images. Another attempt involves the use of inertial sensors (e.g., gyroscopes, accelerometers, and a compass) that are mounted on the user's head (such as on a helmet or in a pair of goggles) to ascertain the user's head poses. In addition, head pose tracking schemes have been proposed where inertial sensors are combined with one or more conventional video cameras to obtain head pose estimates without having to instrument the environment.

SUMMARY

Head pose tracking technique embodiments described herein also generally involve periodically tracking the location and orientation of a person's head within a space. In one general exemplary embodiment, this is accomplished using a group of sensors configured so as to be disposed on a user's head. This group of sensors advantageously includes a depth sensor apparatus used to identify the three dimensional locations of points within a scene sensed by the group of sensors, and at least one other type of sensor. A computing device is used to run a head pose tracking computer program. The computer program includes a module for periodically inputting data output by each sensor in the group of sensors. It also includes a module for using the inputted data to compute a transformation matrix each time data is input from one or more of the sensors. This transformation matrix, when applied to a previously determined head pose location and orientation established when the first sensor data was input, identifies a current head pose location and orientation.

More particularly, in one embodiment the aforementioned other type of sensor is a color video camera. The depth sensor apparatus and the color video camera are synchronized so as to periodically produce contemporaneous scene data in the form of a depth frame and a color image frame, respectively. In addition, the depth sensor apparatus and the color video camera are calibrated so as to map each pixel in each color image frame to a corresponding three dimensional scene location in the contemporaneously-produced depth frame (if possible). The aforementioned computer program then involves first inputting each contemporaneously-produced depth frame and color image frame. For each of these frame pairs input (after the first), matching features are identified between the last-input color image frame and a color image frame produced immediately preceding the last-input color image frame. A first transformation matrix is then estimated using the identified matching features and the corresponding three dimensional locations of the matching features between the last-input color image frame and the color image frame produced immediately preceding the last-input color image frame. This transformation matrix defines the translation and rotation of points from one frame to another, and in particular from the color image frame produced immediately preceding the last-input color image frame to the last-input color image frame. Next, a final transformation matrix is estimated that defines the translation and rotation of points from the first color image frame input to the last-input color image frame. This is accomplished by accumulating a previously-computed transformation matrix, which defines the translation and rotation of points from the first color image frame to the color image frame input immediately preceding the last-input color image frame, with the first transformation matrix defining the translation and rotation of points to the last-input color image frame from the immediately preceding color image frame. The final transformation matrix is then applied to a previously determined head pose location and orientation within the scene depicted in the first color image frame input, to identify a current head pose location and orientation.

In yet another embodiment the aforementioned other types of sensors not only includes a color video camera configured as before, but also a suite of inertial sensors that measure angular velocity around three axes and linear acceleration along the three axes. The inertial sensors provide a frame of angular velocity and linear acceleration data at a rate equaling or exceeding the rate at which the depth and color image frames are provided. In this case, the aforementioned computer program involves first inputting each inertial sensors frame produced. Then, for each inertial sensors frame input (after the first), a current inertial sensor-based transformation matrix is estimated using the last-input inertial sensors frame. This inertial sensor-based transformation matrix defines the translation and rotation of points from the immediately preceding inertial sensors frame input to the last-input inertial sensors frame. A final inertial sensor-based transformation matrix is then estimated that defines the translation and rotation of points from the first inertial sensors frame input to the last-input inertial sensors frame by accumulating a previously-computed transformation matrix, which defines the translation and rotation of points from the first inertial sensors frame to the inertial sensors frame input immediately preceding the last-input inertial sensors frame, with the current inertial sensor-based transformation matrix that defines the translation and rotation of points from the immediately preceding inertial sensors frame input to the last-input inertial sensors frame. Next, it is determined if new color video and depth frames have been produced. If not, the final inertial sensor-based transformation matrix is applied to a previously determined head pose location and orientation associated with the first inertial sensors frame input to identify the current head pose location and orientation. However, if new color video and depth frames have been produced, they are input and matching features between the last-input color image frame and a color image frame produced immediately preceding the last-input color image frame are identified. An image-based transformation matrix is then estimated using the identified matching features and the corresponding three dimensional locations of the matching features in the last-input color image frame and the color image frame produced immediately preceding the last-input color image frame. This imaged-based transformation matrix defines the translation and rotation of points from the color image frame produced immediately preceding the last-input color image frame to the last-input color image frame. A final image-based transformation matrix that defines the translation and rotation of points from the first inertial sensor frame input to the last-input color image frame is estimated next by accumulating a previously-computed transformation matrix, which defines the translation and rotation of points from the first inertial sensors frame to the color image frame input immediately preceding the last-input color image frame, with the current image-based transformation matrix defining the translation and rotation of points to the last-input color image frame from the immediately preceding color image frame. The final image-based transformation matrix and the final inertial sensor-based transformation matrix are fused to produce a single combined transformation matrix that defines the translation and rotation of points from the first inertial sensors frame input to the last-input inertial sensors frame. This combined transformation matrix is then applied to a previously determined head pose location and orientation associated with the first inertial sensors frame input to identify the current head pose location and orientation.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIGS. 7A-E are a flow diagram generally outlining one embodiment of a head tracking process using data output by the depth sensor apparatus, color video camera and suite of inertial sensors depicted in FIG. 6.

DETAILED DESCRIPTION

In the following description of head pose tracking technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Head Pose Tracking

Figure 1:
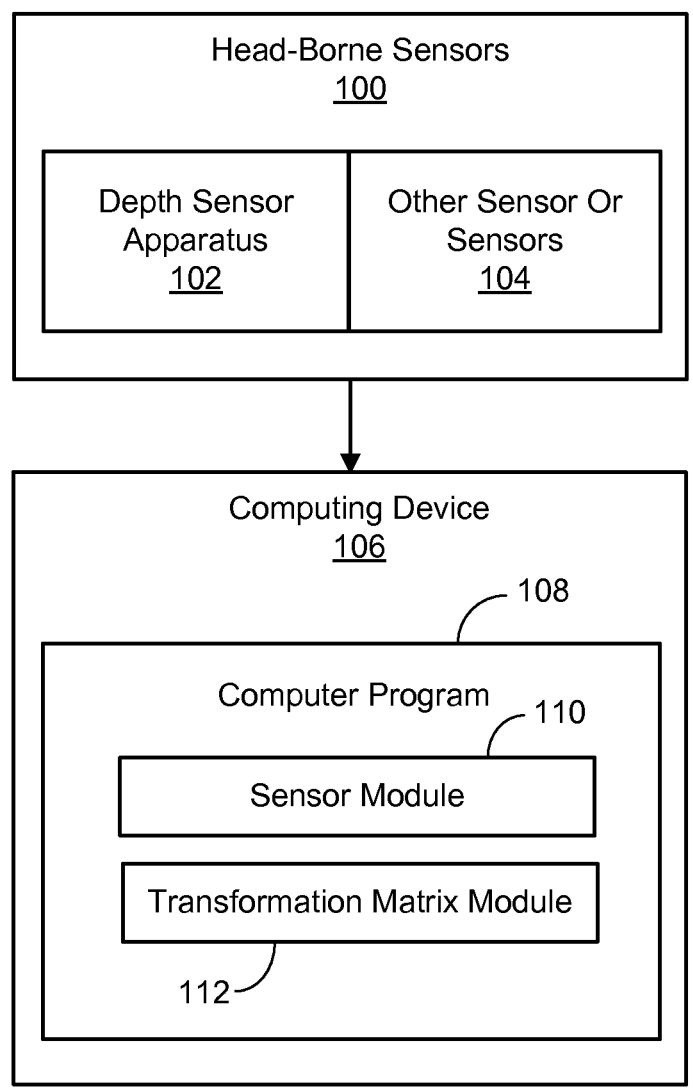
FIG. 1 is a simplified diagram depicting a head pose tracking system for implementing the head pose tracking technique embodiments described herein.

In general, head pose tracking technique embodiments described herein periodically track the location and orientation of a person's head within a space. In one general implementation illustrated in FIG. 1, this involves a system employing a group of sensors 100 configured so as to be disposed on a user's head. This group of head-borne sensors 100 includes a depth sensor apparatus 102 used to identify the three dimensional locations of features within a scene sensed by the group of sensors, and at least one other type of sensor 104. In addition, this exemplary head pose tracking system has a computing device 106 (such as one described in the Computing Environment section found later in this description) that runs a computer program 108 having program modules that include a sensor module 110 and a transformation matrix module 112. Generally, the sensor module periodically inputs data output by each sensor in the group of sensors, and the transformation matrix module uses the inputted data each time data is input from one or more of the sensors to compute a transformation matrix. The transformation matrix can be used to, when applied to a previously determined head pose location and orientation established when the first sensor data was input, identify a current head pose location and orientation.

Different sensor schemes are employed by the head pose tracking technique embodiments described herein. As indicated above, each of these schemes includes a depth sensor apparatus (which typically includes a projector and a receiver of some type) used to identify the distance between the apparatus and locations within a space. In one exemplary implementation, the depth sensor apparatus is employed along with a conventional color video camera. In another exemplary implementation, the depth sensor apparatus is employed along with a conventional color video camera and a suite of inertial sensors. Each of these schemes also includes a computing device as indicated previously for processing the sensor signals output by the various sensors. In the sections to follow each of the foregoing exemplary implementations will be described in more detail, and an implementing process will be described for each as well.

Figure 2:
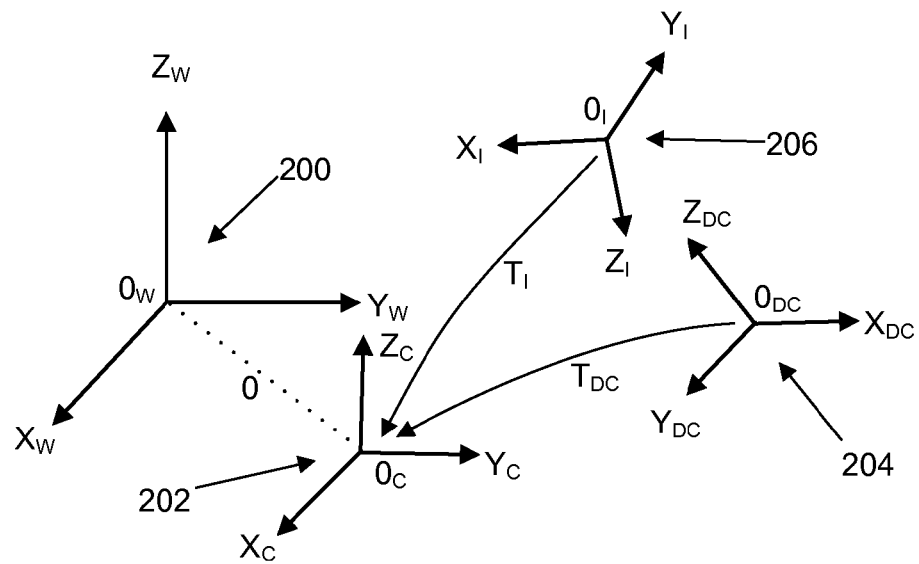
FIG. 2 is a simplified drawing of the various frames and coordinate schemes employed in implementing the head pose tracking technique embodiments described herein.

However, first it is noted that in head pose tracking, the position ($T_{WH}$ or $T_{WS}$) and the orientation ($R_{WH}$ or $R_{WS}$) of the head coordinate frame (frame "H") or sensor frames (frames "S") in the world frame (frame "W") are estimated. The sensor frames refer to the color camera frame (frame "C") 202 and the receiver frame 204 of the depth sensor apparatus (frame "DC"), as well as the inertial sensors frame (frame "I") 206 when included. These sensor frames are transformed to be the same as the head frame, and it is assumed that the world frame 200 overlays with the transformed sensor frames at the beginning of tracking. More particularly, each of the three sensor frames has three axes. The relative transformation between the three sensor frames does not change over time. As such, the relative transformations are pre-calibrated offline. As a practical matter, the color camera's sensor frame at the beginning is used as the world frame, and the depth sensor receiver and inertial sensors frames are transformed to match. The foregoing frames are defined as shown in FIG. 2 where the coordinates of the world frame 200 are denoted as $X_W$, $Y_W$, $Z_W$, the coordinates of the color camera frame 202 are denoted as $X_C$, $Y_C$, $Z_C$, the coordinates of the depth sensor receiver frame 204 are denoted as $X_{DC}$, $Y_{DC}$, $Z_{DC}$, and the coordinates of the inertial sensors frame 206 are denoted as $X_I$, $Y_I$, $Z_I$. Note that the arrows $T_I$ and $T_{DC}$ represent the aforementioned relative transformations associated with the depth sensor receiver and inertial sensors frames, and the dotted line O indicates the correspondence between the color camera frame and the world frame.

In addition to the foregoing frames and coordinates, the following notations and definitions will be used in the descriptions to follow:
$p^1$: "coordinate of a point p in frame 1";
$p^2$: "coordinate of a point p in frame 2";
$R_{12}$: "rotation from frame 1 to frame 2" or "frame 2 described in frame 1";
$T_{12}$: "translation from the origin of frame 1 to the origin of frame 2, described in frame 1"; and
$p^1 = R_{12} p^2 + T_{12}$: "transform the coordinate of point p from frame 2 to frame 1".

In general, the convention employed is that a superscript indicates which frame the point is in, while a subscript indicates other information, such as the order of transformation.

Figure 3:
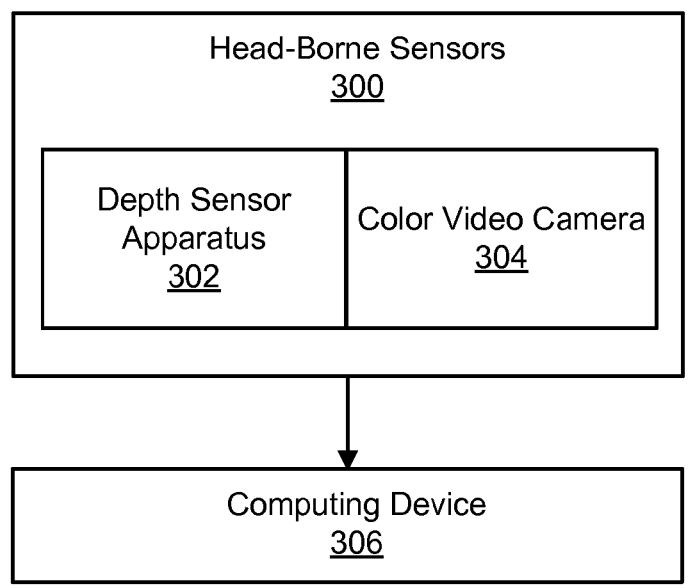
FIG. 3 is a simplified diagram depicting an exemplary head pose tracking system of FIG. 1 that employs a depth sensor apparatus along with a conventional color video camera.
Figure 4A:
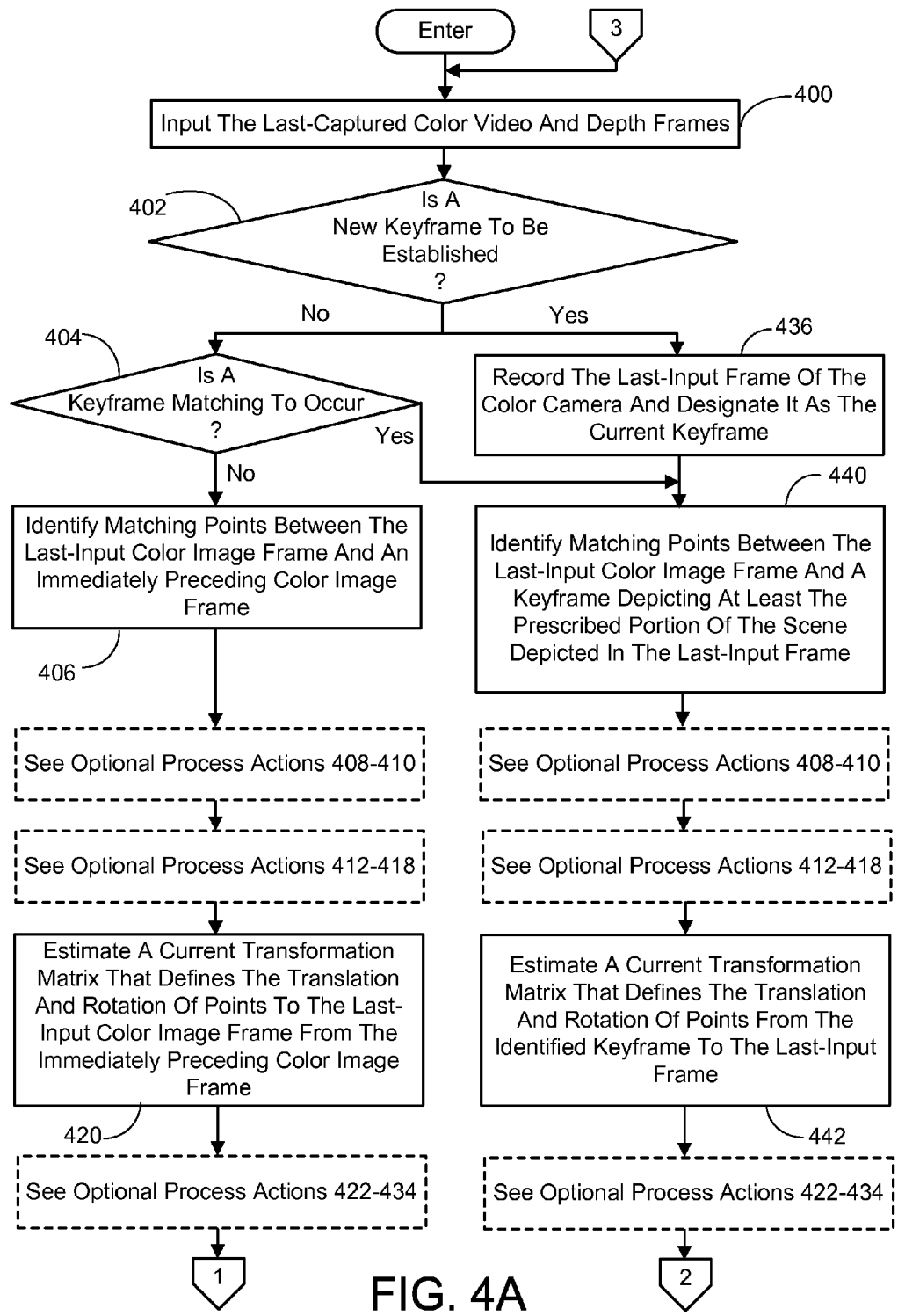
FIGS. 4A-D are a flow diagram generally outlining one embodiment of a head tracking process using data output by the depth sensor apparatus and color video camera depicted in FIG. 3.
Figure 4B:
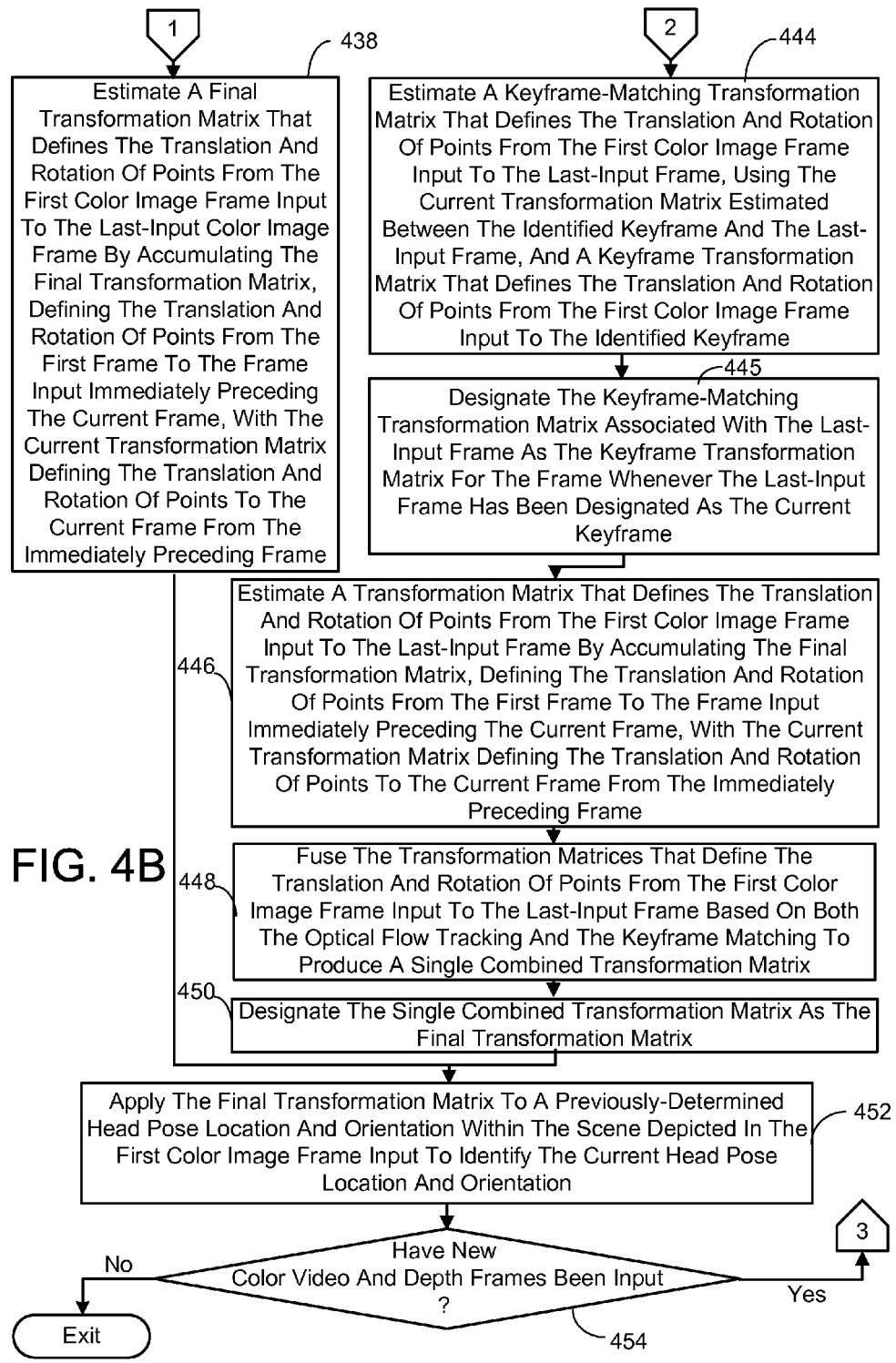
Figure 4C:
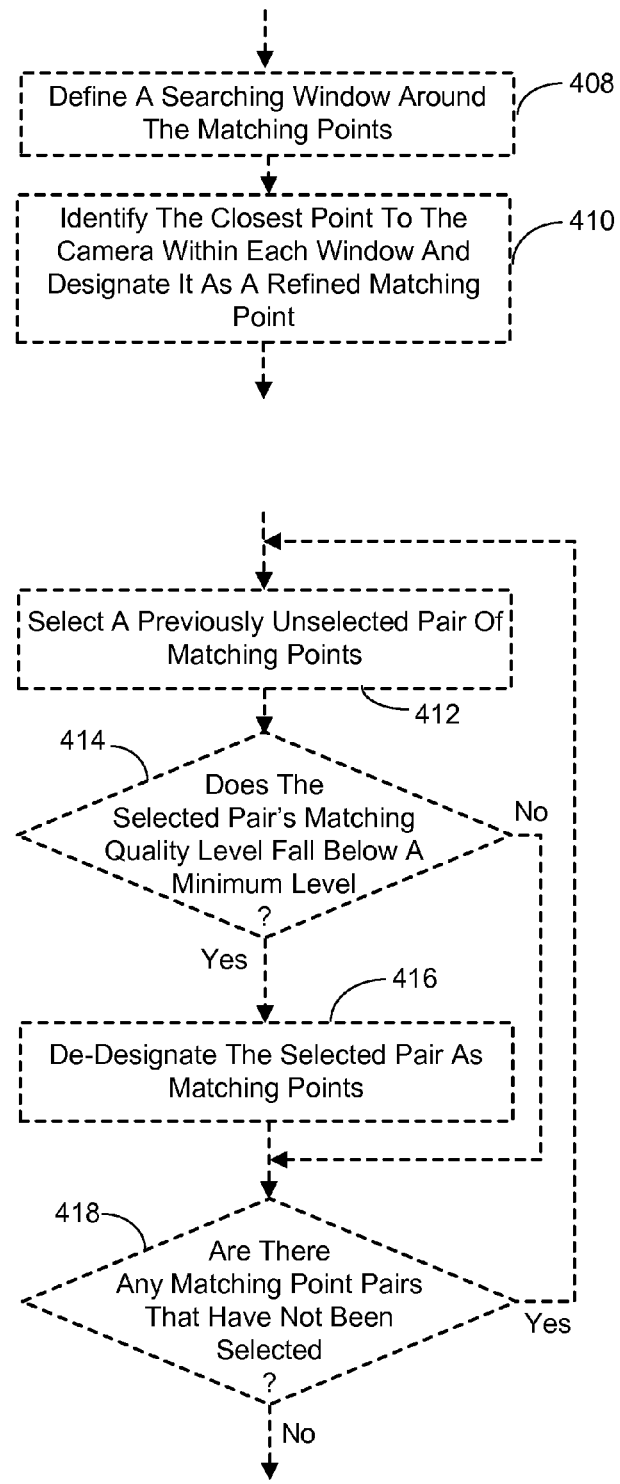
Figure 4D:
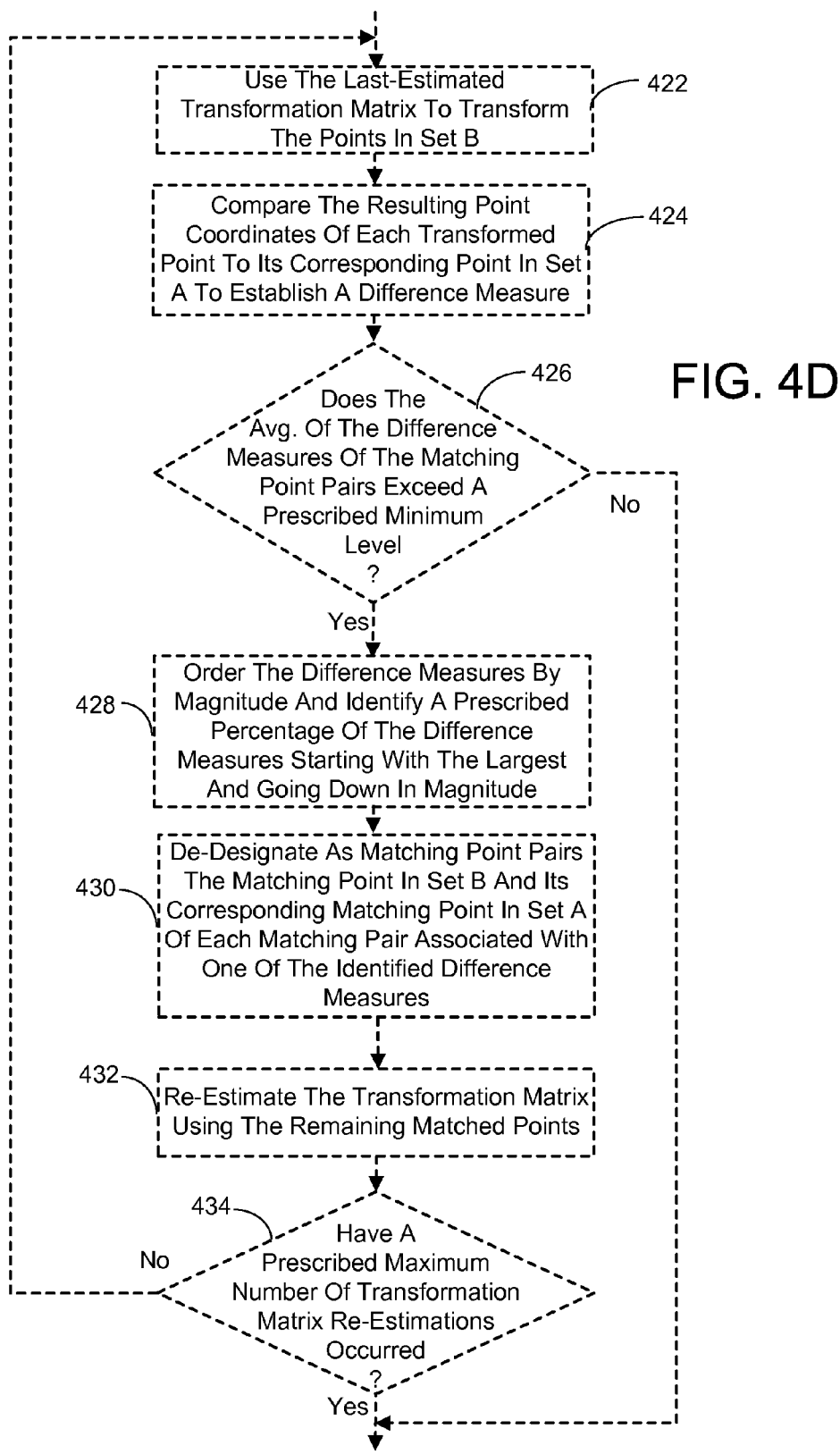

1.1 Exemplary System Implementation and Process Using a Color Video Camera and a Depth Sensor Apparatus As mentioned previously, one exemplary system implementation generally employs head-borne sensors 300 including a depth sensor apparatus 302 and a conventional color video camera 304, as well as a computer 306, as shown in FIG. 3. It will be appreciated that various types of depth sensor apparatuses can be employed. By way of example, but not limitation, the depth sensor apparatus can be an infrared projector and infrared receiver in the form of an infrared video camera. The infrared projector and camera work in a conventional manner, with the infrared projector emitting infrared light into the environment, and the infrared camera capturing infrared light reflections off of objects and surfaces in the environment. The reflected infrared light is then used to compute the distance from the receiver and a point or feature in the environment in a convention manner.

As for the color video camera, this can be any appropriate visible light video camera (also known as a RGB (red/green/blue) video camera).

It is noted that the depth sensor apparatus and the color video camera are configured so as to be worn by a user on his or her head (e.g., built onto a helmet, or into a pair of goggles or eyeglasses, or both). It will be appreciated a fixed spatial relationship is maintained between the depth sensor apparatus and the color video camera. Furthermore, it is assumed the orientation and position of the depth sensor apparatus and the color video camera mimics the orientation and position of the user's head. Still further, the depth sensor apparatus and the color video camera are configured so to provide synchronized color and depth image sequences.

Before tracking, the color camera and the depth camera are calibrated with respect to each other to obtain a transformation between them. This is accomplished using conventional methods. Using the calibration result, the pixels in a color image can be mapped to the pixels in the corresponding depth image if possible. In one implementation, the pose tracking is performed by applying an optical flow tracker to the color image sequence. Depth information is used in a transformation calculation. However, head pose estimations based purely on the optical flow tracking can eventually lead to drift. Therefore, in one implementation, one or more keyframes are recorded, and the tracking result is corrected by comparing the result with these keyframes.

More particularly, referring to FIGS. 4A-D, in one implementation of the head pose tracking technique embodiments described herein, the image data captured by the depth sensor apparatus and color video camera is captured on a frame-by-frame basis. Each captured frame is in turn input into the aforementioned computer. Thus, the process begins by inputting the last-captured color video and depth frames (process action 400). It is then determined if a new keyframe is to be established (process action 402). In one version, the first frame input is established as a keyframe. This first keyframe can be the only keyframe established for the duration of the process. Alternatively, new keyframes can be established periodically. For example, whenever the last-input color frame depicts less than a prescribed portion (e.g., 40%) of the scene depicted in the previously established keyframes. Thus, a collection of keyframes can be recorded such that a visual feature panorama of the surrounding scene is constructed over time. The purpose of establishing a keyframe or keyframes will be described in more detail shortly.

Whenever it is determined a new keyframe is not to be established, it is then determined whether a keyframe matching is to occur (process action 404). The optical flow tracking tracks the feature points in successive frames. The transformations computed between the successive frames can eventually produce a drift effect. In one implementation, this drift effect is corrected by using an absolute reference. One way to create this absolute reference is to memorize one or more keyframes along with their transformation matrix back to the first color image frame input as successive frames are processed. Whenever the current frame depicts a portion of the scene (e.g., 50%) that was also captured in a keyframe, it is possible to correct for the drift as will be described shortly. It is noted that the use of keyframe matching in this manner also has the advantage of allowing for recovery from temporal tracking failures. However, for reasons to be described shortly, keyframe matching may not be performed for each new color image frame input. Whenever, keyframe matching is not to be performed for the last-input color image frame, for each new frame input after the first, the aforementioned optical flow technique is employed to identify matching features between the last-input color image frame and a color image frame produced immediately preceding the last-input color image frame (process action 406). Any appropriate conventional optical flow method can be used for this purpose although in one implementation it should be computational efficient as to allow for real-time performance. Assuming a camera frame rate around 30 Hz, the optical flow tracker can find point matches between the previous frame and the current frame efficiently for normal speed motions. The number of matched points found depends on the environment and the parameters settings in the tracker. It is noted that image features other than points are sometimes matched in an optical flow procedure. While the description provided herein refers to matched points, it will be understood that other matched features can be used instead of, or in addition to, matched points.

Next, in process action 420, a current transformation matrix is estimated using the optical flow information and the previously input depth frames. This transformation matrix defines the translation and rotation of points to the last-input color image frame from the frame produced immediately preceding it. It is noted that the optical flow technique identifies the 2D image coordinates of matching points in two frames. However, there is a scale ambiguity and the accuracy is hard to guarantee. This is where the depth images corresponding to the two color image frames come into play. The depth images provide 3D information of the scene, and so the 3D locations of the matched points can be found for each color camera frame. Given the 3D coordinates of two or more sets of matched points, the aforementioned transformation matrix can be estimated using standard methods.

However, ascertaining the depth value for a given point in the color image from the corresponding depth image can be difficult owing to the fact that the matched points are often corner points. Thus, there is a possibility that a matched point is a 3D corner. In this case, the projection of this point on the depth map may fall on an edge or in a vacuum area. This causes ambiguity, because for two matched points, one could be found on a closer surface while the other could be found on a farther surface, or either of them might have invalid depth value. This will reduce the number of useful matches. To address this issue, in one implementation (shown in FIG. 4C in broken line boxes to indicate the optional nature of the actions), prior to computing the transformation matrix, a depth correction module is employed. More particularly, this module involves defining a small searching window (e.g., 3×3 pixels) around the directly mapped matching points (process action 408). The closest point to the camera within each window is then identified and designated as a refined matching point (process action 410). These refined matching points can then be used to compute the transformation matrix in process action 420. By choosing the closer surface, the aforementioned ambiguity is avoided.

It is noted that during optical flow tracking, matching point outliers will likely be introduced. The number of outliers can be reduced by deleting matches with lower matching quality as typically identified by the matching algorithm employed. More particularly, in one implementation (shown in FIG. 4C in broken line boxes to indicate the optional nature of the actions), prior to computing the transformation matrix, a previously unselected pair of matching points is selected (process action 412). It is then determined in process action 414 if a matching quality level as identified by the matching algorithm employed to identify the selected matching points falls below a prescribed minimum level (e.g., 1 millimeter). If so, the selected matching points are de-designated as matching points (process action 416). Once the selected matching points have been de-designated, or if the matching quality level of the selected points does not fall below the prescribed minimum level, it is determined if there are any remaining matching points that have not been selected (process action 418). If there are, then process actions 412 through 418 are repeated as necessary until all the pairs of matching points have been considered.

While the foregoing procedure will reduce the number of outlier matching points, it often will not guarantee a high performance owing to remaining outliers. Accordingly, after deleting matches that have bad matching qualities as indicated by their matching quality being below a prescribed minimum level, an iterative procedure can be employed to further remove at least the most significant of the remaining outliers. More particularly, in one implementation (shown in FIG. 4D in broken line boxes to indicate the optional nature of the actions), the last-estimated transformation matrix $(R_{AB}, T_{AB})$ (where A represents the set of points in the previous frame that respectively match a point in the set of points B of the current frame) is used to transform the points in set B (process action 422). The resulting point coordinates of each transformed point is then compared to its corresponding point in set A to establish a difference measure (process action 424). Next, the average of the difference measures of the matching point pairs is computed, and it is determined in process action 426 if this average exceeds a prescribed minimum level (e.g., 1 millimeter). If the average does exceed the prescribed minimum level, then the difference measures are ordered by magnitude and a prescribed percentage (e.g., 10%) of the difference measures starting with the largest and going down in magnitude are identified (process action 428). The matching point in set B and its corresponding matching point in set A of each matching pair associated with one of the identified difference measures are then de-designated as a matching point pairs (process action 430). Next, the transformation matrix is re-estimated using the remaining matching point pairs (process action 432). It is then determined if a prescribed maximum number (e.g., 3) of transformation matrix re-estimation iterations has been reached (process action 434). If not, process actions 422 through 434 are repeated, as appropriate. This continues until either the previously-computed average does not exceed the prescribed minimum level or it is determined the prescribed maximum number of transformation matrix re-estimation iterations has been reached.

A final transformation matrix is estimated next that defines the translation and rotation of points from the first color image frame input to the last frame input by accumulating the final transformation matrix, defining the translation and rotation of points from the first-input color image frame to the color image frame input immediately preceding the last-input frame, with the current transformation matrix defining the translation and rotation of points to the last-input color image frame from the frame immediately preceding it (process action 438). It is further noted that the foregoing transformation matrices are accumulated to form the final transformation matrix using conventional methods.

Figure 5:
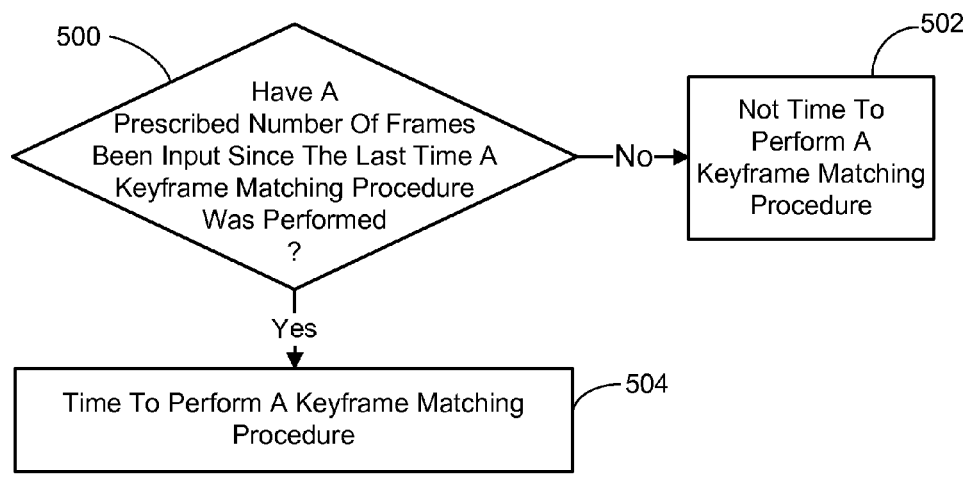
FIG. 5 is a flow diagram generally outlining one implementation of a process for determining whether a keyframe matching is to occur.

If, however, in process action 402 it was determined that a new keyframe is to be established, then the last-input frame of the color camera is recorded and designated as a current keyframe (process action 436). In addition, with regard to the decision as the whether keyframe matching is to occur, since there can be a significant motion between the current frame and a keyframe even if they both depict a same portion of the scene, strong features (such as can be found using a conventional Speeded Up Robust Features (SURF) matching procedure) are typically needed in the matching to achieve accurate result. Unfortunately, such powerful feature detectors and descriptors are usually computational expensive. Accordingly, in one version, keyframe matching is only done for every few frames (e.g., 15). This makes sense because the drift will only be significant after the transformation error has accumulated for a few frames. In view of the foregoing, FIG. 5 outlines one way of determining whether a keyframe matching is to occur. First, it is determined if a prescribed number of frames have been input since the last time a keyframe matching procedure was performed (process action 500). If the prescribed number of frames has not been input, then it is designated that it is not time for a new keyframe matching (process action 502). If, however, the prescribed number of frames have been input, it is deemed time to perform a keyframe matching procedure (process action 504).

In view of the foregoing, and referring again to FIG. 4A, if it is determined in process action 404 that a keyframe matching is to occur, or if the last-input color image frame has been designated as the current keyframe, then matching points between the last-input color image frame and a keyframe depicting at least the prescribed portion of the scene depicted in the last-input frame (which will be hereinafter referred to as the identified keyframe), are identified (process action 440). As indicated previously, in one implementation, a conventional SURF matching procedure is employed for this purpose. It is noted that the optional matching point refinement and outlier elimination actions described previously in process actions 408 through 410 and in process actions 412 through 418 can be implemented here as well to refine the matching point locations between the identified keyframe and the last-input frame.

Once matching points between the last-input color image frame and the identified keyframe have been identified, they are used in conjunction with the 3D location data from the corresponding depth frames to estimate a current transformation matrix (i.e., $(R_{t,k}, T_{t,k})$) in process action 442. This transformation matrix defines the translation and rotation of points from the identified keyframe (i.e., k) to the last-input frame (i.e., t). It is noted that this transformation matrix estimation is accomplished in the same manner that the transformation matrix between successive frames was estimated in process action 420. In addition, the optional iterative outlier elimination actions described previously in process actions 422 through 434 can be implemented here as well to potentially increase the accuracy of the estimated transform. Then a keyframe-matching transformation matrix that defines the translation and rotation of points from the first color image frame input to the last-input frame is estimated using the transformation matrix obtained between the identified keyframe and the last-input frame, and the previously-computed keyframe transformation matrix (i.e., $(R_{1,r}, T_{1,r})$) that defines the translation and rotation of points from the first color image frame input (i.e., frame 1) to the identified keyframe (process action 444). In one implementation, this is accomplished by multiplying the transformation matrix estimated between the identified keyframe and the last-input frame, and the previously-computed transformation matrix between the first frame and the identified keyframe. In cases where the last-input color image frame has been designated as the current keyframe, the keyframe-matching transformation matrix associated with this frame is then designated as keyframe transformation matrix for the frame (process action 445). This established a pre-computed keyframe transformation matrix that defines the translation and rotation of points from the first color image frame input to the current keyframe for use in computing the keyframe-matching transformation matrix when the next keyframe is created. In addition, a transformation matrix is estimated that defines the translation and rotation of points from the first color image frame input to the last-input frame by accumulating the final transformation matrix, defining the translation and rotation of points from the first-input color image frame to the color image frame input immediately preceding the last-input frame, with the current transformation matrix defining the translation and rotation of points to the last-input color image frame from the frame immediately preceding it (process action 446). As indicated previously, this is possible since for the optical flow tracking, the transformations estimated from each frame to the next frame starting with the first (i.e., $(R_{12}, T_{12})$, $(R_{23}, T_{23})$, . . . , $(R_{k-1,k}, T_{k-1,k})$) can be accumulated to produce a transformation matrix from the first frame keyframe (i.e., frame 1) to most current frame (i.e., frame k) using conventional methods.

At this point in the process, separate transformation matrices that define the translation and rotation of points from the first color image frame input to the last-input frame exist based on both optical flow tracking and keyframe matching. These transform matrices are fused to produce a single combined transformation matrix (process action 448).

In one implementation, a weighted interpolation between the two transformation matrix estimations is performed to get a potentially better transformation. Since the 3D locations of the matching points are known via the depth images, it is possible to define a transformation estimation error metric using the 3D information. More particularly, from coordinate frame 1 (F1), consider an image 1 (I1). And from coordinate frame 2 (F2), consider an image 2 (I2). The previously estimated transformation matrix $(R_{12}, T_{12})$ describes the rotation and translation from F1 to F2. The image points in I2 from F2 are transformed into F1 by applying $(R_{12}, T_{12})$. The origin of F1 (the optical center of the camera at that time) is then connected with each point transformed. If there is a point in I1 on the connected line in the 3D space, the distance between these two points is calculated. The aforementioned error metric is then the average of the calculated distances over all the points involved in the calculation (i.e., the ones that there are I1 points on the lines). To reduce the amount of computation, in one implementation, the images are down-sampled to the same degree (e.g., 50%) prior to the above-described transforming procedure. In addition, there will be some points out the scene depicted in I1 after the transformation that are not considered.

Once the transformation estimation error metric (hereinafter referred to as the error) is computed, an interpolation between the two transform matrices computed for the current frame is performed. In one implementation, this is done by using linear interpolation in the quaternion space. More particularly, the aforementioned weight is calculated using equation:

$$\text{weight} = \frac{1}{1 + (a * \text{error})^2}$$

where a is a constant (e.g., 10000). The resulting weight values are then normalized before using them to interpolate between the two transform matrices computed for the current frame. In one implementation, this interpolation is accomplished as follows. Let p1 and q1 denote the position and orientation (in quaternion) of the first transformation matrix. Let p2 and q2 denote the position and orientation (in quaternion) of the second transformation matrix. Let w1 denote the error corresponding to the first transformation matrix, and w2 the error corresponding to the second transformation matrix. Let a1=w1/(w1+w2), and a2=w2/(w1+w2). The interpolated position and quaternion are then p=a1*p1+a2*p2, q=a1*q1+a2*q2. It is noted that the foregoing linear interpolation of the orientation described in quaternion works well when the angle between the two quaternions are small. Spherical Linear Interpolation can be used for larger angles.

Referring again to FIG. 4B, once the single combined transformation matrix is generated it is designated as the final transformation matrix (process action 450). The final transformation matrix (whether generated in process action 438 or 450) is then applied to a previously determined head pose location and orientation within the scene depicted in the first color image frame input to identify the current head pose location and orientation in the scene depicted in the last-input color image frame (process action 452). The current head pose and transformation matrix can then be used for a variety of other tasks, including computing the position of a virtual object in the current frame in an augmented reality application.

It is next determined whether new color video and depth frames have been input (process action 454). If so, then process actions 400 through 454 are repeated as necessary. This continues for as long as new frames are captured and input into the computer.

Figure 6:
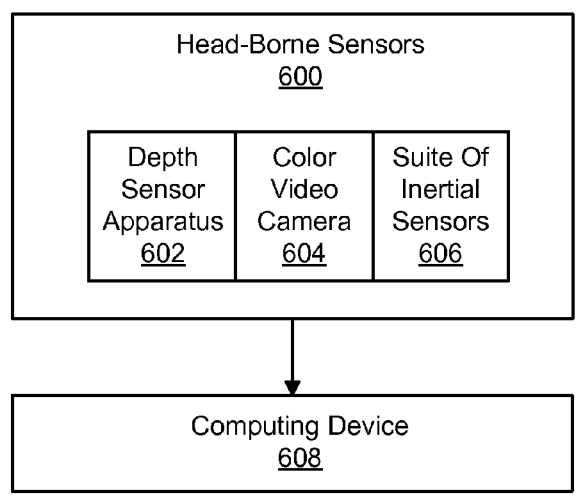
FIG. 6 is a simplified diagram depicting an exemplary head pose tracking system of FIG. 1 that employs a depth sensor apparatus along with a conventional color video camera and a suite of inertial sensors.
Figure 7A:
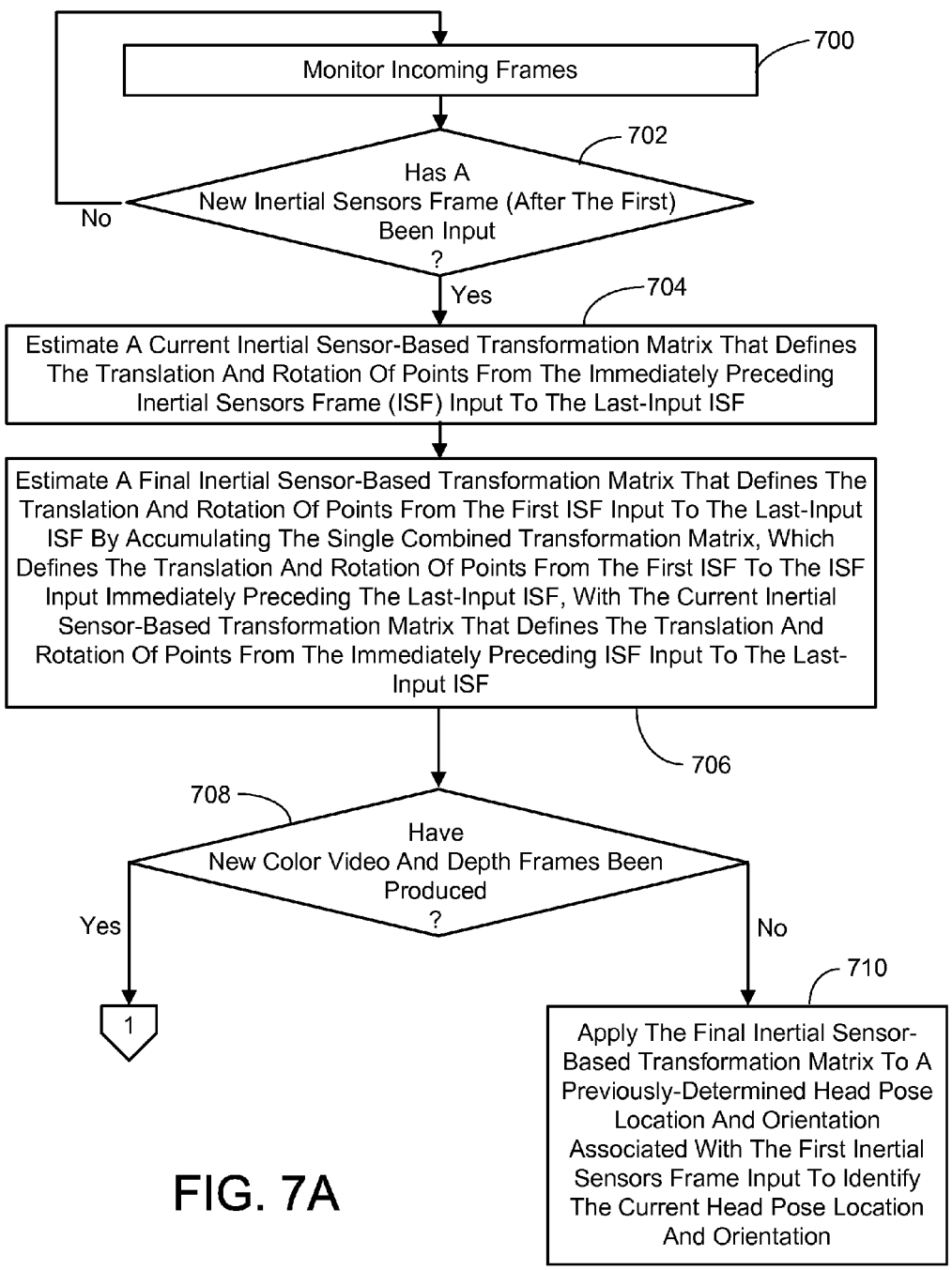
Figure 7B:
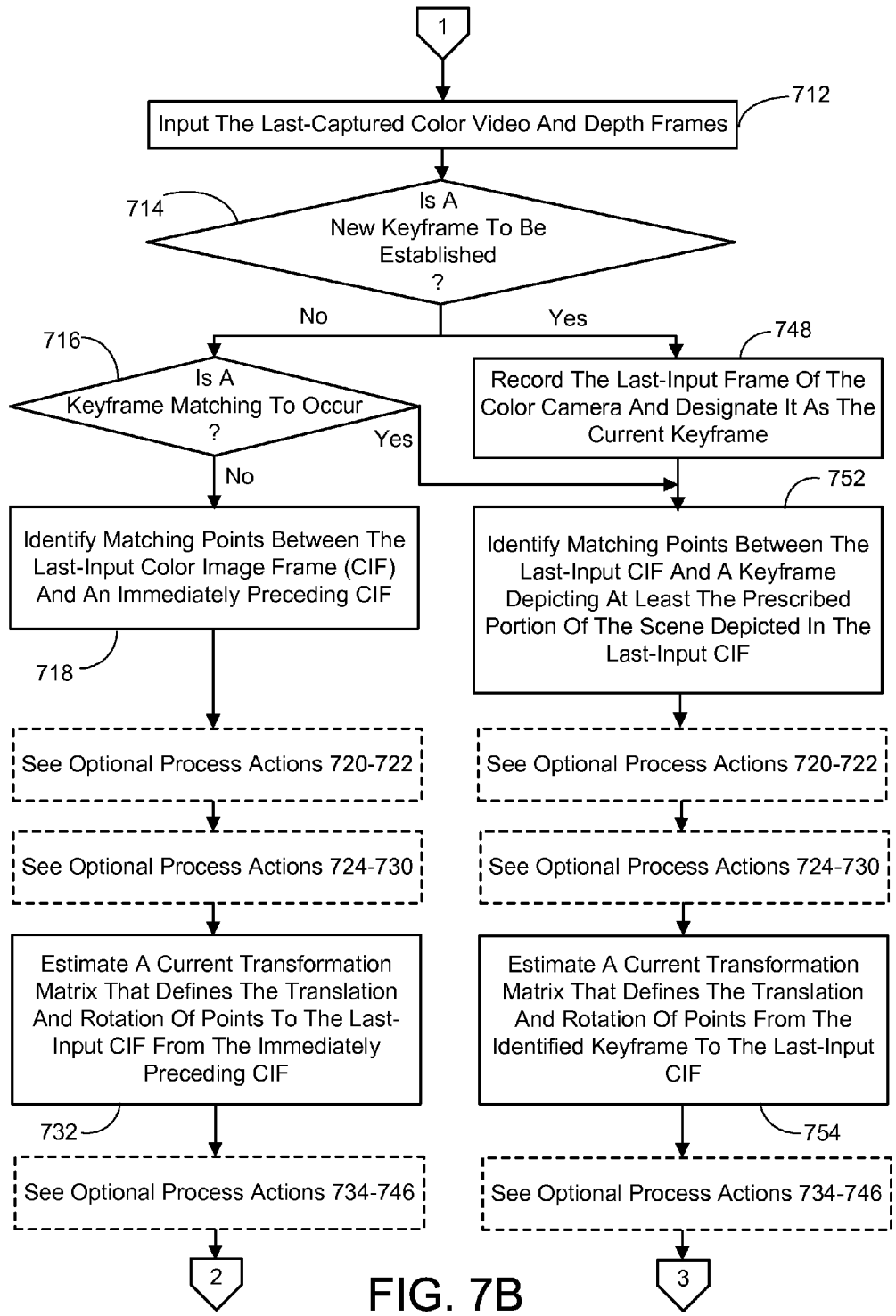
Figure 7D:
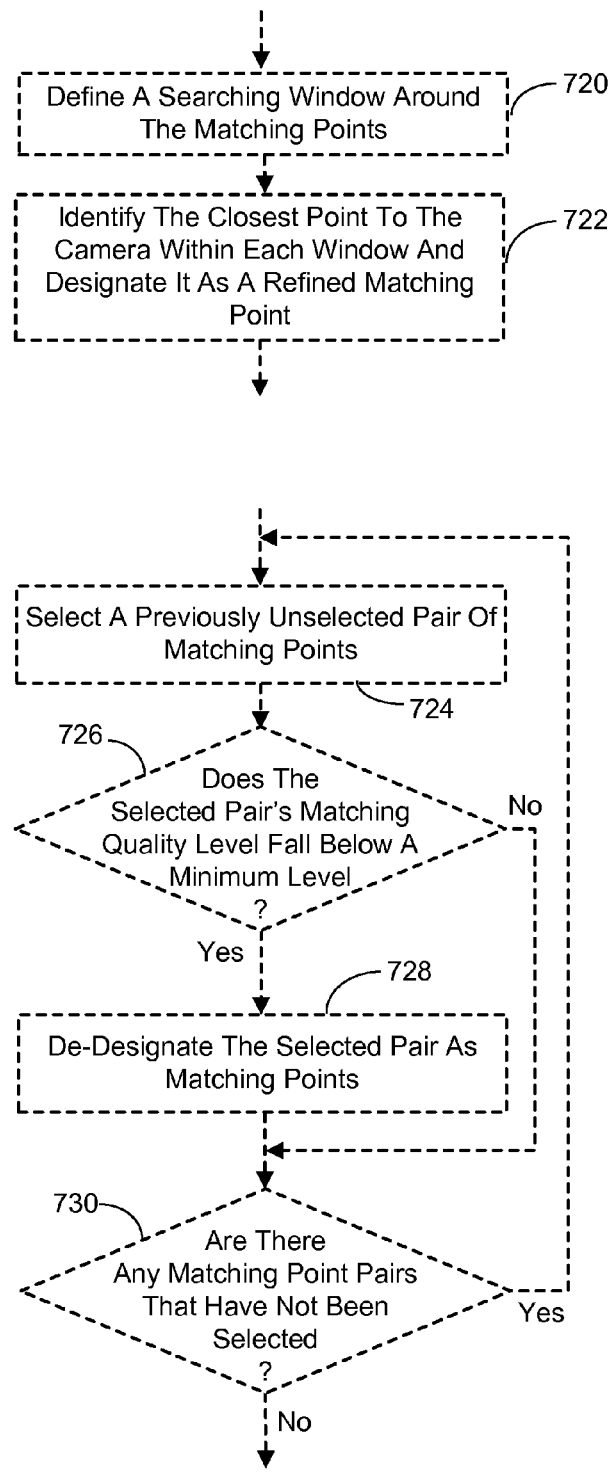
Figure 7E:
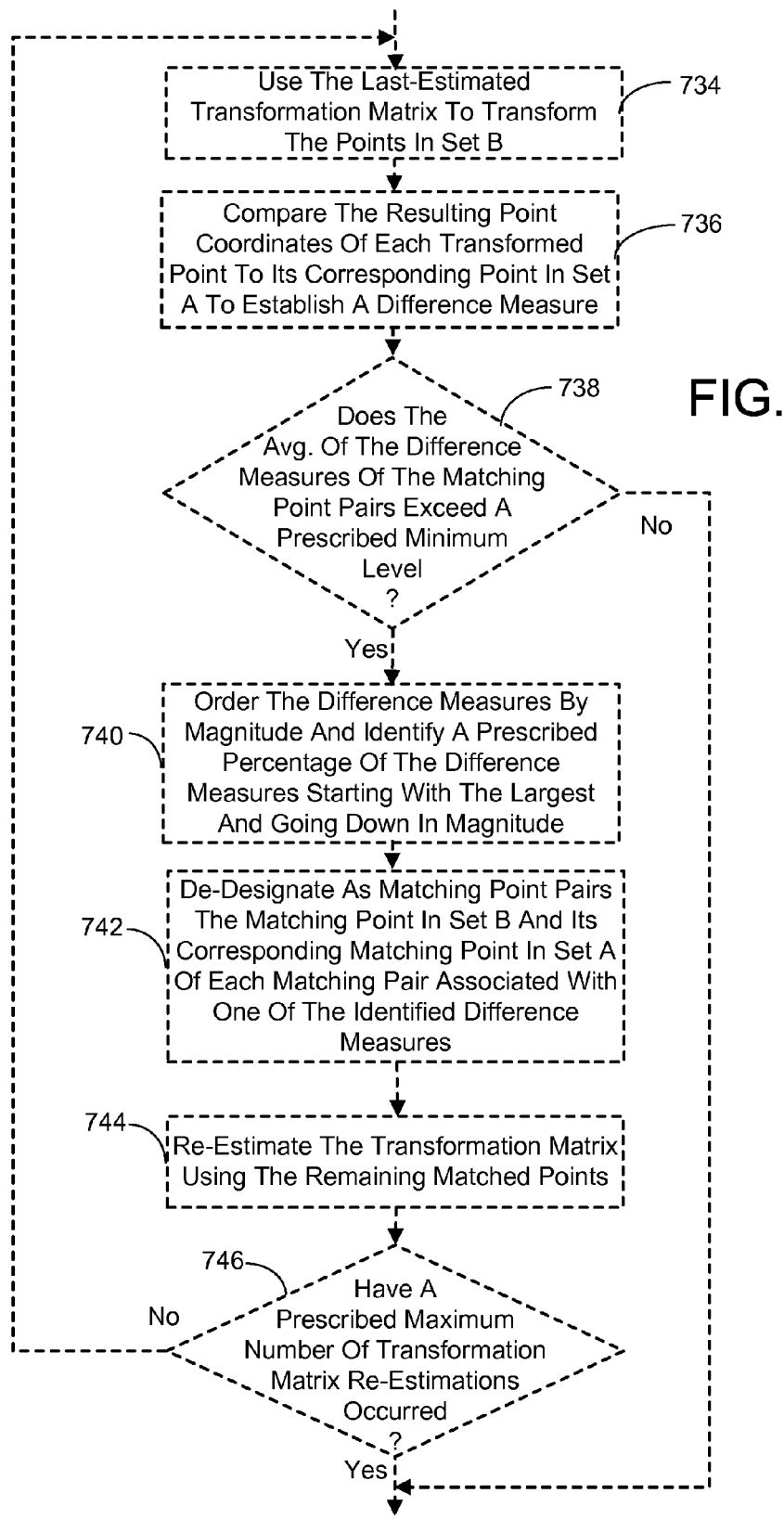

1.2 Exemplary System Implementation and Process Using a Color Video Camera, a Depth Sensor Apparatus and Inertial Sensors As mentioned previously, another exemplary system implementation generally employs head-borne sensors 600 including a depth sensor apparatus 602, a conventional color video camera 604 and a suite of inertial sensors 606, along with a computer 608, as illustrated in FIG. 6. It will be appreciated that, here again, various types of depth sensor apparatuses can be employed, such as the infrared projector and infrared camera apparatus described previously. With regard to the inertial sensors, in general this includes a group of sensors that measure velocity, orientation, and gravitational forces using a combination of accelerometers and gyroscopes. In one implementation a conventional inertial measurement unit is employed, which includes a gyroscope and an accelerometer (e.g., a 3-axis MEM gyroscope and a 3-axis MEM accelerometer which enables the sensors to be integrate into one tiny chip). The gyroscope measures the angular velocity around three axes, while the accelerometer measures the linear acceleration along the three axes.

It is noted that the depth sensor apparatus, color video camera, and inertial sensors are configured so as to be worn by a user on his or her head (e.g., built onto a helmet, or into a pair of goggles or eyeglasses, or both). It will be appreciated that a fixed spatial relationship is maintained between these sensors and they share a common coordinate system origin. Furthermore, it is assumed the orientation and position of these sensors mimics the orientation and position of the user's head. Here again, the depth sensor apparatus and the color video camera are configured so to provide synchronized color and depth image sequences.

The addition of the inertial sensors has advantages, particularly when the environment does not have a visually rich texture. More particularly, cameras and inertial sensors have complimentary characteristics. For example, cameras have lower frame rates and require more computational power in processing, but can provide significantly more accurate measurements than inertial sensors in a visual feature rich environment. Whereas, inertial sensors can reach a very high frame rate and the processing is much more efficient, and can help the exemplary system to overcome periods where visual features are weak. Moreover, tracking based on gyroscope and accelerometer will lead to significant drift in a few seconds, but cameras can be used to record landmarks and correct for the drift.

In one implementation, the pose tracking is performed using measurements from the inertial sensors, and combining this with the visual measurements from the color and depth images when available. Here again, with regard to the visual measurements, an optical flow tracker is applied to the color image sequence. Depth information is used in a transformation calculation. However, head pose estimations based purely on the optical flow tracking can eventually lead to drift. Therefore, in one implementation, one or more keyframes are recorded, and the tracking result is corrected by comparing the result with these keyframes.

More particularly, referring to FIGS. 7A-E, in one implementation of the head pose tracking technique embodiments described herein, the image data captured by the depth sensor apparatus and color video camera is captured on a frame-by-frame basis. In addition, the inertial data captured by the inertial sensors is captured periodically at a rate that is at least equal to and typically faster than the aforementioned image data. For convenience, each set of contemporaneously captured inertial sensor readings will be referred to as a frame of the inertial sensors. Each captured image and inertial sensors frame is in turn input into the aforementioned computer. The process begins by monitoring incoming frames (process action 700). It is periodically determined if a new inertial sensors frame (after the first) has been input (process action 702). If not, the monitoring continues. If a new inertial sensors frame has been input, then a current inertial sensor-based transformation matrix is estimated (process action 704). This inertial sensor-based transformation matrix defines the translation and rotation of points from the immediately preceding inertial sensors frame input to the last-input inertial sensors frame, and is estimated using conventional methods. The inertial sensor-based transformation matrix is then used to estimate a final inertial sensor-based transformation matrix that defines the translation and rotation of points from the first inertial sensors frame input to the last-input inertial sensors frame (process action 706). This is accomplished by accumulating the single combined transformation matrix, which defines the translation and rotation of points from the first inertial sensors frame to the inertial sensors frame input immediately preceding the last-input inertial sensors frame, with the current inertial sensor-based transformation matrix that defines the translation and rotation of points from the immediately preceding inertial sensors frame input to the last-input inertial sensors frame, using conventional methods. It is then determined if new color video and depth frames have also been produced (process action 708). If not, then the final inertial sensor-based transformation matrix is applied to a previously-determined head pose location and orientation associated with the first inertial sensors frame input to identify the current head pose location and orientation (process action 710). The current head pose and the final inertial sensor-based transformation matrix can then be used for a variety of other tasks, including computing the position of a virtual object in the current frame in an augmented reality application.

If, however, it was determined in process action 708 that new color video and depth frames have also been produced, then they are processed in a manner similar to that described in conjunction with FIGS. 4A-D. More particularly, the new color video and depth frames are input (process action 712), and it is determined if a new keyframe is to be established (process action 714). In one version, the first frame input is established as a keyframe. This first keyframe can be the only keyframe established for the duration of the process. Alternatively, new keyframes can be established periodically. For example, whenever the last-input color frame depicts less than a prescribed portion (e.g., 40%) of the scene depicted in the previously established keyframes. Thus, a collection of keyframes can be recorded such that a visual feature panorama of the surrounding scene is constructed over time. The purpose of establishing a keyframe or keyframes will be described in more detail shortly.

Whenever it is determined a new keyframe is not to be established, it is then determined whether a keyframe matching is to occur (process action 716). The optical flow tracking tracks the feature points in successive frames. The transformations computed between the successive frames can eventually produce a drift effect. In one implementation, this drift effect is corrected by using an absolute reference. One way to create this absolute reference is to memorize one or more keyframes along with their transformation matrix back to the first color image frame input as successive frames are processed. Whenever the current frame depicts a portion of the scene (e.g., 50%) that was also captured in a keyframe, it is possible to correct for the drift as will be described shortly. It is noted that the use of keyframe matching in this manner also has the advantage of allowing for recovery from temporal tracking failures. However, for reasons to be described shortly, keyframe matching may not be performed for each new color image frame input. Whenever, keyframe matching is not to be performed for the last-input color image frame, for each new frame input after the first, the aforementioned optical flow technique is employed to identify matching features between the last-input color image frame and a color image frame produced immediately preceding the last-input color image frame (process action 718). Any appropriate conventional optical flow method can be used for this purpose although in one implementation it should be computational efficient as to allow for real-time performance. Assuming a camera frame rate around 30 Hz, the optical flow tracker can find point matches between the previous frame and the current frame efficiently for normal speed motions. The number of matched points found depends on the environment and the parameters settings in the tracker. It is noted that image features other than points are sometimes matched in an optical flow procedure. While the description provided herein refers to matched points, it will be understood that other matched features can be used instead of, or in addition to, matched points.

Next, in process action 732, a current transformation matrix is estimated using the optical flow information and the previously input depth frames. This transformation matrix defines the translation and rotation of points to the last-input color image frame from the frame produced immediately preceding it. As described previously, the optical flow technique identifies the 2D image coordinates of matching points in two frames. However, there is a scale ambiguity and the accuracy is hard to guarantee. This is where the depth images corresponding to the two color image frames come into play. The depth images provide 3D information of the scene, and so the 3D locations of the matched points can be found for each color camera frame. Given the 3D coordinates of two or more sets of matched points, the aforementioned transformation matrix can be estimated using standard methods.

Also as described previously, ascertaining the depth value for a given point in the color image from the corresponding depth image can be difficult owing to the fact that the matched points are often corner points. Thus, there is a possibility that a matched point is a 3D corner. In this case, the projection of this point on the depth map may fall on an edge or in a vacuum area. This causes ambiguity, because for two matched points, one could be found on a closer surface while the other could be found on a farther surface, or either of them might have invalid depth value. This will reduce the number of useful matches. To address this issue, in one implementation (shown in FIG. 7D in broken line boxes to indicate the optional nature of the actions), prior to computing the transformation matrix, a depth correction module is employed. More particularly, this module involves defining a small searching window (e.g., 3×3 pixels) around the directly mapped matching points (process action 720). The closest point to the camera within each window is then identified and designated as a refined matching point (process action 722). These refined matching points can then be used to compute the transformation matrix in process action 732. By choosing the closer surface, the aforementioned ambiguity is avoided.

In addition, during optical flow tracking matching point outliers will likely be introduced. The number of outliers can be reduced by deleting matches with lower matching quality as typically identified by the matching algorithm employed. More particularly, in one implementation (shown in FIG. 7D in broken line boxes to indicate the optional nature of the actions), prior to computing the transformation matrix, a previously unselected pair of matching points is selected (process action 724). It is then determined in process action 726 if a matching quality level as identified by the matching algorithm employed to identify the selected matching points falls below a prescribed minimum level (e.g., 1 millimeter). If so, the selected matching points are de-designated as matching points (process action 728). Once the selected matching points have been de-designated, or if the matching quality level of the selected points does not fall below the prescribed minimum level, it is determined if there are any remaining matching points that have not been selected (process action 730). If there are, then process actions 724 through 730 are repeated as necessary until all the pairs of matching points have been considered.

As described previously, while the foregoing procedure will reduce the number of outlier matching points, it often will not guarantee a high performance owing to remaining outliers. Accordingly, after deleting matches that have bad matching qualities as indicated by their matching quality being below a prescribed minimum level, an iterative procedure can be employed to further remove at least the most significant of the remaining outliers. More particularly, in one implementation (shown in FIG. 7E in broken line boxes to indicate the optional nature of the actions), the last-estimated transformation matrix ($R_{AB}, T_{AB}$) (where A represents the set of points in the previous frame that respectively match a point in the set of points B of the current frame) is used to transform the points in set B (process action 734). The resulting point coordinates of each transformed point is then compared to its corresponding point in set A to establish a difference measure (process action 736). Next, the average of the difference measures of the matching point pairs is computed, and it is determined in process action 738 if this average exceeds a prescribed minimum level (e.g., 1 millimeter). If the average does exceed the prescribed minimum level, then the difference measures are ordered by magnitude and a prescribed percentage (e.g., 10%) of the difference measures starting with the largest and going down in magnitude are identified (process action 740). The matching point in set B and its corresponding matching point in set A of each matching pair associated with one of the identified difference measures are then de-designated as a matching point pairs (process action 742). Next, the transformation matrix is re-estimated using the remaining matching point pairs (process action 744). It is then determined if a prescribed maximum number (e.g., 3) of transformation matrix re-estimation iterations has been reached (process action 746). If not, process actions 734 through 746 are repeated, as appropriate. This continues until either the previously-computed average does not exceed the prescribed minimum level or it is determined the prescribed maximum number of transformation matrix re-estimation iterations has been reached.

A transformation matrix is estimated next that defines the translation and rotation of points from the first inertial sensors frame input to the last-input color image frame by accumulating the single combined transformation matrix, which defines the translation and rotation of points from the first inertial sensors frame to the color image frame input immediately preceding the last-input color image frame, with the current transformation matrix defining the translation and rotation of points to the last-input color image frame from the immediately preceding color image frame (process action 750). It is further noted that the foregoing transformation matrices are accumulated to form this transformation matrix using conventional methods.

If, however, in process action 714 it was determined that a new keyframe is to be established, then the last-input frame of the color camera is recorded and designated as a current keyframe (process action 748). In addition, with regard to the decision as the whether keyframe matching is to occur, since there can be a significant motion between the current frame and a keyframe even if they both depict a same portion of the scene, strong features (such as can be found using a conventional Speeded UpRobust Features (SURF) matching procedure) are typically needed in the matching to achieve accurate result. Unfortunately, such powerful feature detectors and descriptors are usually computational expensive. Accordingly, in one version, keyframe matching is only done for every few frames (e.g., 15), as described previously. This makes sense because the drift will only be significant after the transformation error has accumulated for a few frames. In view of the foregoing, FIG. 5 outlines one way of determining whether a keyframe matching is to occur. First, it is determined if a prescribed number of frames have been input since the last time a keyframe matching procedure was performed (process action 500). If the prescribed number of frames has not been input, then it is designated that it is not time for a new keyframe matching (process action 502). If, however, the prescribed number of frames have been input, it is deemed time to perform a keyframe matching procedure (process action 504).

In view of the foregoing, and referring again to FIG. 7B, if it is determined in process action 716 that a keyframe matching is to occur, or if the last-input color image frame has been designated as the current keyframe, then matching points between the last-input color image frame and a keyframe depicting at least the prescribed portion of the scene depicted in the last-input frame (which will be hereinafter referred to as the identified keyframe), are identified (process action 752). As indicated previously, in one implementation, a conventional SURF matching procedure is employed for this purpose. It is noted that the optional matching point refinement and outlier elimination actions described previously in process actions 720 through 722 and in process actions 724 through 730 can be implemented here as well to refine the matching point locations between the identified keyframe and the last-input frame.

Once matching points between the last-input color image frame and the identified keyframe have been identified, they are used in conjunction with the 3D location data from the corresponding depth frames to estimate a current transformation matrix (i.e., $(R_{t,k}, T_{t,k})$) in process action 754. This transformation matrix defines the translation and rotation of points from the identified keyframe (i.e., k) to the last-input frame (i.e., t). It is noted that this transformation matrix estimation is accomplished in the same manner that the transformation matrix between successive frames was estimated in process action 732. In addition, the optional iterative outlier elimination actions described previously in process actions 734 through 746 can be implemented here as well to potentially increase the accuracy of the estimated transform. Then a keyframe-matching transformation matrix that defines the translation and rotation of points from the first color image frame input to the last-input color image frame is estimated using the current transformation matrix obtained between the identified keyframe and the last-input color image frame, and the previously-computed keyframe transformation matrix (i.e., $(R_{1,t}, T_{1,t})$) that defines the translation and rotation of points from the first color image frame input (i.e., frame 1) to the identified keyframe (process action 756). In one implementation, this is accomplished by multiplying the transformation matrix estimated between the identified keyframe and the last-input frame, and the previously-computed transformation matrix between the first frame and the identified keyframe. In cases where the last-input color image frame has been designated as the current keyframe, the keyframe-matching transformation matrix associated with this frame is then designated as keyframe transformation matrix for the frame (process action 757). This established a pre-computed keyframe transformation matrix that defines the translation and rotation of points from the first color image frame input to the current keyframe for use in computing the keyframe-matching transformation matrix when the next keyframe is created. In addition, a transformation matrix is estimated that defines the translation and rotation of points from the first inertial sensors frame input to the last-input color image frame by accumulating the single combined transformation matrix, which defines the translation and rotation of points from the first inertial sensors frame to the color image frame input immediately preceding the last-input color image frame, with the current transformation matrix defining the translation and rotation of points to the last-input color image frame from the immediately preceding color image frame (process action 758). As indicated previously, this is possible since for the optical flow tracking, the transformations estimated from each frame to the next frame starting with the first (i.e., $(R_{12}, T_{12}), (R_{23}, T_{23}), \ldots, (R_{k-1,k}, T_{k-1,k})$) can be accumulated to produce a transformation matrix from the first frame keyframe (i.e., frame 1) to most current frame (i.e., frame k) using conventional methods.

At this point in the process, separate transformation matrices that define the translation and rotation of points from the first inertial sensors frame input to the last-input inertial sensors frame exist based on either, inertial data and optical flow tracking; or inertial data, optical flow tracking and keyframe matching. In the first case, the transformation matrix that defines the translation and rotation of points from the first inertial sensors frame input to the last-input color image frame based on the optical flow tracking, and the final inertial sensor-based transformation matrix that defines the translation and rotation of points from the first inertial sensors frame input to the last-input inertial sensors frame, are fused to produce a single combined transformation matrix that defines the translation and rotation of points from the first inertial sensors frame input to the last-input inertial sensors frame (process action 760). In the latter case, the transformation matrices that define the translation and rotation of points from the first inertial sensors frame input to the last-input color image frame based on both the optical flow tracking and the keyframe matching, as well as the final inertial sensor-based transformation matrix that defines the translation and rotation of points from the first inertial sensors frame input to the last-input inertial sensors frame, are fused to produce a single combined transformation matrix that defines the translation and rotation of points from the first inertial sensors frame input to the last-input inertial sensors frame (process action 762)

In one implementation, a recursive Bayesian framework and extended Kalman filter (EKF) are employed to fuse the transformation matrices. More particularly, a commonly used, yet powerful tool for dealing with this kind of fusion and state estimation problem is the recursive Bayesian filter. It can fuse the measurement from different sources into one uniform framework, and estimate the hidden state through the established process model and observation model. It can also deal with different frame rates of different sensors naturally.

A recursive Bayesian filter is used to estimate the posterior probability distribution function (PDF) of the hidden state variables of a system, through modeling the system and measuring the system output. For a given system with a state vector x, where x may not be observable, its process can be modeled generally as:

$$x_k = f(x_{k-1}, u_k, v_{k-1}),$$

where $u_k$ is the input into the system and $v_k$ is the process noise. This equation describes the time evolution of the state variables, with the influence of the input $u_k$.

At the same time, the measurable output of the system can be related with the state variables using a measurement equation:

$$z_k = h(x_k, e_k),$$

where $z_k$ is the observation vector and $e_k$ is the measurement noise.

The idea is to estimate the posterior distribution of $X_k$ given $z_{1:k}$. It is well known that a recursive solution can be obtained by applying Bayes' theorem, resulting in:

$$p(x_k | z_{1:k}) = \frac{p(z_k | x_k) p(x_k | z_{1:k-1})}{\int p(z_k | x_k) p(x_k | z_{1:k-1}) dx_k}$$

$$p(x_{k+1} | z_{1:k}) = \int p(x_{k+1} | x_k) p(x_k | z_{1:k}) dx_k.$$

The multidimensional integral in the above equations cannot be solved analytically in all but a few special cases. A common case is when both of the process equation and the measurement equation are linear, and the process noise and the measurement noise can be modeled using zero mean Gaussian distribution:

$$x_k = A x_{k-1} + B u_k + v_{k-1}$$

$$z_k = H x_k + e_k$$

$$p(w) \sim N(0, Q)$$

$$p(v) \sim N(0, R),$$

where Q is the process noise covariance and R is the measurement noise covariance.

In this case, all the densities will be Gaussian and it will be sufficient to just propagate the mean and the covariance. This results in the famous Kalman Filter:

Time Update:

$$\hat{x}_k^- = A\hat{x}_{k-1} + B u_k$$

$$P_k^- = A P_{k-1} A^T + Q$$

Measurement Update:

$$K_k = P_k^- H^T (H P_k^- H^T + R)^{-1}$$

$$\hat{x}_k = \hat{x}_k^- + K_k(z_k - H\hat{x}_k^-)$$

$$P_k = (1 - K_k H) P_k^-.$$

In the case that the model is non-linear, it can be linearized locally by calculating the partial derivatives. This results in the Extended Kalman Filter (EKF):

$$A_{[i,j]} = \frac{\partial f_{[i]}}{\partial x_{[j]}} (\hat{x}_{k-1}, u_k, 0)$$

$$V_{[i,j]} = \frac{\partial f_{[i]}}{\partial w_{[j]}} (\hat{x}_{k-1}, u_k, 0)$$

$$H_{[i,j]} = \frac{\partial h_{[i]}}{\partial x_{[j]}} (\tilde{x}_k, 0)$$

$$E_{[i,j]} = \frac{\partial h_{[i]}}{\partial v_{[j]}} (\tilde{x}_k, 0)$$

Time Update:

$$\hat{x}_k^- = f(\hat{x}_{k-1}, u_k, 0)$$

$$P_k^- = A_k P_{k-1} A_k^T + W_k Q_{k-1} W_k^T$$

Measurement Update:

$$K_k = P_k^- H_k^T (H_k P_k^- H_k^T)^{-1}$$

$$\hat{x}_k = \hat{x}_k^- + K_k(z_k - h(\hat{x}_k^-, 0))$$

$$P_k = (1 - K_k H_k) P_k^-.$$

Given the foregoing, a system model can be defined. More particularly, the state variables should include the position and the orientation of the head. Also included are the linear velocity and acceleration, and rotational velocity, so that a constant linear acceleration and rotational velocity can be assumed. Sensor biases are also included to deal with the slightly changing bias of the inertial sensors. It is noted that in the following it is assumed the inertial sensors are an accelerometer (a) and a gyroscope (g) having a common coordinate frame origin. Thus, in one implementation, $$x_k = (p_k^W, \dot{p}_k^W, \ddot{p}_k^W, q_k^W, w_k^I, b_{g,k}^I, b_{a,k}^I)$$

where $p_k^W$ is the head position described in frame "W". $\dot{p}_k^W$ and $\ddot{p}_k^W$ are head linear velocity and acceleration respectively. $q_k^W$ is the head orientation described using quaternion in frame "W". $w_k^I$ is the head angular velocity described in frame "I". The biases $b_{g,k}^I, b_{a,k}^I$ are also in the inertial sensors coordinate frame. A quaternion is used to describe the orientation, because it is continuous in the tracking space.

Next, the process is modeled as follows:

$$p_k^W = p_{k-1}^W + T\dot{p}_{k-1}^W + \frac{T^2}{2}\ddot{p}_{k-1}^W$$

$$\dot{p}_k^W = \dot{p}_{t-1}^W + T\ddot{p}_{k-1}^W$$

$$\ddot{p}_k^W = \ddot{p}_{k-1}^W + v_{\ddot{p},k-1}^W$$

$$q_k^W = q_{k-1}^W \odot \exp\left(\frac{T}{2}w_{k-1}^I\right)$$

$$w_k^I = w_k^I + v_{w,k-1}^I$$

$$b_{g,k}^I = b_{g,k-1}^I + v_{g,k-1}^I$$

$$b_{a,k}^I = b_{a,k-1}^I + v_{a,k-1}^I$$

The operations are defined as:

$$w = \begin{pmatrix} w_x \\ w_y \\ w_z \end{pmatrix}$$

$$\exp(w) \triangleq \begin{pmatrix} \cos\|w\| \\ \frac{w}{\|w\|}\sin\|w\| \end{pmatrix}$$

$$q_1 = \begin{pmatrix} a_1 \\ x_1 \\ y_1 \\ z_1 \end{pmatrix}$$

$$q_2 = \begin{pmatrix} a_2 \\ x_2 \\ y_2 \\ z_2 \end{pmatrix}$$

$$q_1 \odot q_2 \triangleq \begin{pmatrix} a_1 a_2 - \begin{pmatrix} x_1 \\ y_1 \\ z_1 \end{pmatrix} \cdot \begin{pmatrix} x_2 \\ y_2 \\ z_2 \end{pmatrix} \\ a_1\begin{pmatrix} x_2 \\ y_2 \\ z_2 \end{pmatrix} + \begin{pmatrix} x_1 \\ y_1 \\ z_1 \end{pmatrix} a_2 + \begin{pmatrix} x_1 \\ y_1 \\ z_1 \end{pmatrix} \times \begin{pmatrix} x_2 \\ y_2 \\ z_2 \end{pmatrix} \end{pmatrix}$$

As for the observation equations, these need to address the inertial sensors data, as well as the color image and depth image data. For the inertial sensors (i.e., gyroscope and accelerometer), the observation equations are:

$$z_{a,k}^I = (R(q_k^W))^{-1}(\ddot{p}_k^W + g^W) + b_{a,k}^I + e_{a,k}^I$$

$$z_{g,k}^I = w_k^I + b_{g,k}^I + e_{g,k}^I$$

However, regarding how to use the image data, there are different options. In one implementation, in order to linearize the observation equations, the transformation estimations are used as measurements. Both the estimation from the optical flow tracking and keyframe matching (if available) are included as follows:

$$z_{c,q,k-s,k}^{C_{k-s}} = (q_{k-s}^W \odot q_{IC})^{-1} \odot (q_k^W \odot q_{IC}) + e_{c,q,k-s,k}^{C_{k-s}}$$

-continued $$z_{c,T,k-s,k}^{C_{k-s}} = (R(q_{IC}))^{-1}(R(q_{k-s}^W))^{-1}$$

$$((R(q_k^W)T_{IC} + p_k^W) - (R(q_{k-s}^W)T_{IC} + p_{k-s}^W)) + e_{c,q,k-s,k}^{C_{k-s}}$$

$$z_{c,q,k-t,k}^{C_{k-t}} = (q_{k-t}^W \odot q_{IC})^{-1} \odot (q_K^W \odot q_{IC}) + e_{c,q,k-t,k}^{C_{k-t}}$$

$$z_{c,T,k-t,k}^{C_{k-t}} =$$

$$(R(q_{IC}))^{-1}(R(q_{k-t}^W))^{-1}((R(q_k^W)T_{IC} + p_k^W) - (R(q_{k-t}^W)T_{IC} + p_{k-t}^W)) + e_{c,q,k-t,k}^{C_{k-t}}$$

where $z_{c,q,k-s,k}^{C_{k-s}}$ is the quaternion describing the rotation from time step k-s to current time step k obtained from the optical flow pipeline, in the camera coordinate frame at k-s. $q_{IC}$ is the known rotation from the frame "I" to frame "C". $z_{c,T,k-s,k}^{C_{k-s}}$ is the translation from the time step k-s to step k obtained from the optical flow pipeline, in the camera coordinate frame at k-s. $z_{c,q,k-t,k}^{C_{k-t}}$ is the quaternion describing the rotation from time step k-t to current time step k, obtained from the keyframe pipeline. Time step t is a frame where the keyframe was recorded. $z_{c,T,k-t,k}^{C_{k-t}}$ is the translation from the keyframe pipeline. It is noted that when there is no keyframe matching transformation matrix, and just matrices based on inertial data and optical flow tracking, the interpolation weight for the keyframe matching transformation matrix is set to zero.

It is noted that the EKF will run more effectively if the Q and R parameters are tuned. As stated earlier, Q is the process noise covariance and R is the measurement noise covariance. Generally, the smaller the Q is, the more accurate the process is, and the smaller the R is, the more accurate the measurement. R can be measured offline, but Q can only be tuned based on prior knowledge, or assumptions of the movement.

Once a single combined transformation matrix has been generated, it is applied to a previously determined head pose location and orientation associated with the first inertial sensors frame input to identify the current head pose location and orientation (process action 764). The current head pose and the combined transformation matrix can then be used for a variety of other tasks, including computing the position of a virtual object in the current frame in an augmented reality application.

The foregoing process is then repeated for as long as new inertial sensors, color video and depth frames are captured and input into the computing device.

2.0 Exemplary Head Pose Tracking Application

As stated previously, tracking a user's head pose in the manner described above is useful in a variety of applications including an augmented reality. In an augmented reality application an accurate and robust head pose tracking system is needed to ensure a stable display of virtual objects. In addition to the head-borne sensors described above for tracking a user's head pose, such an augmented reality application would also include a head-mounted display (HMD). For example, in one implementation the HMD takes the form of a single semi-transparent glass display that is mounted in front of one of the user's eyes.

3.0 Exemplary Operating Environments

Figure 8:
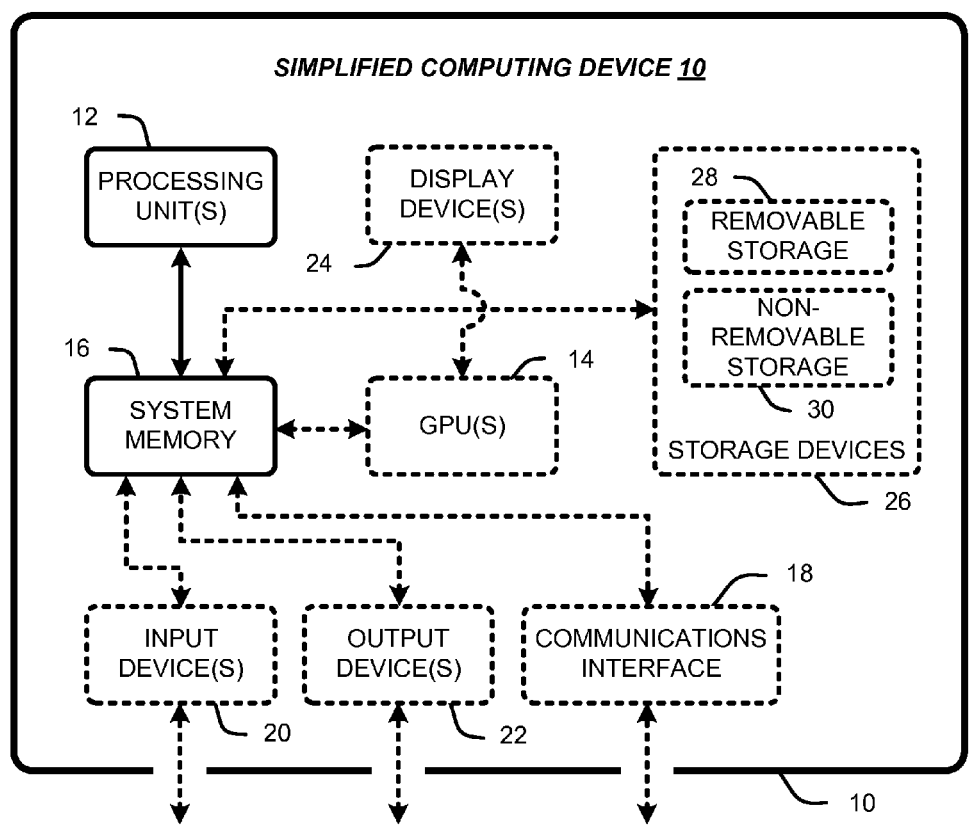
FIG. 8 is a diagram depicting a general purpose computing device constituting an exemplary system for implementing head pose tracking technique embodiments described herein.

The head pose tracking technique embodiments described herein are operational within numerous types of general purpose or special purpose computing system environments or configurations. FIG. 8 illustrates a simplified example of a general-purpose computer system on which various embodiments and elements of the head pose tracking technique embodiments, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 10. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the head pose tracking technique embodiments described herein, the device should have a sufficient computational capability and system memory to enable basic computational operations. In particular, as illustrated by FIG. 8, the computational capability is generally illustrated by one or more processing unit(s) 12, and may also include one or more GPUs 14, either or both in communication with system memory 16. Note that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 18. The simplified computing device of FIG. 8 may also include one or more conventional computer input devices 20 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 8 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various head pose tracking technique embodiments described herein, or portions thereof, may be stored, received, transmitted, or read from any desired combination of computer or machine readable media or storage devices and communication media in the form of computer executable instructions or other data structures.

Finally, the head pose tracking technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

4.0 Other Embodiments

In yet another exemplary hardware system implementation, the depth sensor apparatus is employed along with a suite of inertial sensors, but there is no color camera. This implementation employs the depth sensor and an iterative closest point (ICP) procedure to compute a transformation matrix that defines the translation and rotation of points from the first depth frame input to the last-input depth frame. This depth frame-based transformation matrix would then take the place of the previously described final image-based transformation matrix that was estimated using the color image frames in the previously-described exemplary system using a color video camera, a depth sensor and inertial sensors. Thus, the depth frame-based transformation matrix is fused with the final inertial sensor-based transformation matrix to produce a single combined transformation matrix that defines the translation and rotation of points from the first inertial sensors frame input to the last-input inertial sensors frame, and then the combined transformation matrix is applied to a previously determined head pose location and orientation associated with the first inertial sensors frame input to identify the current head pose location and orientation.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A system for head pose tracking, comprising:
a group of head pose tracking sensors configured such that all the sensors in the group are disposed on a user's head, said group of sensors comprising a depth sensor apparatus used to identify the three dimensional locations of points within a scene sensed by the group of sensors, and a color video camera, said depth sensor apparatus and the color video camera being synchronized so as to periodically produce contemporaneous scene data in the form of a depth frame and a color image frame, and calibrated so as to map each pixel in each color image frame to a corresponding three dimensional scene location in the contemporaneously-produced depth frame;
a computing device; and
a computer program comprising program modules executed by the computing device, wherein the computing device is directed by the program modules of the computer program to,
input each contemporaneously-produced depth frame and color image frame,
for each contemporaneously-produced depth frame and color image frame pair input after the first,
identify matching features between the last-input color image frame and a color image frame produced immediately preceding the last-input color image frame,
estimate a first transformation matrix using the identified matching features and the corresponding three dimensional locations of the matching features in both the last-input color image frame and the color image frame produced immediately preceding the last-input color image frame, said transformation matrix defining the translation and rotation of points to the last-input color image frame from the color image frame produced immediately preceding the last-input color image frame,
estimate a final transformation matrix that defines the translation and rotation of points from the first color image frame input to the last-input color image frame by accumulating a previously-computed transformation matrix, which defines the translation and rotation of points from the first color image frame to the color image frame input immediately preceding the last-input color image frame, with the first transformation matrix defining the translation and rotation of points to the last-input color image frame from the immediately preceding color image frame, and
apply the final transformation matrix to a previously determined head pose location and orientation within the scene depicted in the first color image frame input to identify the current head pose location and orientation in the scene depicted in the last-input color image frame.

2. The system of claim 1, wherein the program module for identifying matching features comprises a sub-module for identifying matching points between the last-input color image frame and a color image frame produced immediately preceding the last-input color image frame using an optical flow technique.

3. The system of claim 2, further comprising a depth correcting program module that is executed prior to executing the program module for estimating the transformation matrix, said depth correcting program module comprising sub-modules for:
defining a window around each identified matching point;
identifying the closest point to the camera within each window; and
designating the identified closest point within each window as a matching point in lieu of the previously identified matching point associated with the window.

4. The system of claim 2, further comprising a matching point outlier de-designation program module that is executed prior to executing the program module for estimating the transformation matrix, said matching point outlier de-designation program module comprising de-designating as matching points each pair of identified matching points having a matching quality level that falls below a prescribed minimum level.

5. The system of claim 2, further comprising a matching point outlier de-designation program module that is executed after executing the program module for estimating the transformation matrix and before executing the program module for estimating the final transformation matrix, said matching point outlier de-designation program module comprising sub-modules for:
(a) applying the last-estimated transformation matrix to the matching points identified in the last-input color image frame to ascertain matching points in the color image frame produced immediately preceding the last-input color image frame that correspond to matching points in the last-input color image frame;
(b) for each previously identified matching point in the color image frame produced immediately preceding the last-input color image frame, computing a difference measure between the coordinates of the previously identified matching point and the coordinates of that matching point ascertained by applying the last-estimated transformation matrix to the matching point in the last-input color image frame that corresponds to the previously identified matching point in the color image frame produced immediately preceding the last-input color image frame;
(c) computing the average of the difference measures of the remaining matching point pairs and determining whether the computed average exceeds a prescribed minimum level;
(d) whenever the computed average exceeds a prescribed minimum level,
ordering the difference measures by magnitude and identifying a prescribed percentage of the difference measures starting with the largest and going down in magnitude,
de-designating as matching points the previously identified matching point in the color image frame produced immediately preceding the last-input color image frame and its corresponding matching point in the last-input color image frame of each matching point pair associated with one of the identified difference measures, re-estimating the transformation matrix using the remaining matching points;

(e) determining if a prescribed maximum number of transformation matrix re-estimation iterations has been reached; and (f) whenever the prescribed maximum number of transformation matrix re-estimation iterations has not been reached, repeating the execution of sub-modules (a) through (f).

6. The system of claim 2, further comprising a keyframe program module that is executed before executing the program module for identifying matching features between the last-input color image frame and a color image frame produced immediately preceding the last-input color image frame, said keyframe program module comprising sub-modules for:

determining if a new keyframe is to be established, and whenever it is determined a new keyframe is to be established, recording the last-input color image frame and designating the recorded frame as a keyframe.

7. The system of claim 6, wherein the sub-module for determining if a new keyframe is to be established, comprises determining that a new keyframe is to be establish whenever the last-input color image frame is the first color image frame input, and whenever the last-input color frame depicts less than a prescribed portion of the scene depicted in the previously established keyframes.

8. The system of claim 6, wherein the keyframe program module further comprises sub-modules for:

whenever it is determined that a new keyframe is not to be established, determining whether a keyframe matching is to occur;

whenever it is determined that a keyframe matching is to occur, or a new keyframe has been established, identifying keyframe matching points between the last-input color image frame and a recorded keyframe that depicts at least a prescribed portion of the scene depicted in the last-input color image frame, estimating a second transformation matrix using the identified keyframe matching points and the corresponding three dimensional locations of the keyframe matching features in both the last-input color image frame and the recorded keyframe that depicts at least the prescribed portion of the scene depicted in the last-input color image frame, said second transformation matrix defining the translation and rotation of points from the recorded keyframe that depicts at least the prescribed portion of the scene depicted in the last-input color image frame to the last-input color image frame, estimating a third transformation matrix using the second transformation matrix and a previously-computed keyframe transformation matrix that defines the translation and rotation of points from the first color image frame input to the recorded keyframe that depicts at least the prescribed portion of the scene depicted in the last-input color image frame, said third transformation matrix defining the translation and rotation of points from the first color image frame input to the last-input color image frame, designating the third transformation matrix as a keyframe transformation matrix that defines the translation and rotation of points from the first color image frame input to the newly established keyframe whenever the last-input color image frame is the newly established keyframe, estimating a fourth transformation matrix that defines the translation and rotation of points from the first color image frame input to the last-input color image frame by accumulating a final transformation matrix defining the translation and rotation of points from the first-input color image frame to the color image frame input immediately preceding the last-input frame, with the first transformation matrix defining the translation and rotation of points to the last-input color image frame from the frame immediately preceding it, fusing the third and the fourth transformation matrices to produce a single combined transformation matrix that defines the translation and rotation of points from the first color image frame input to the last-input color image frame, and designating the combined transformation matrix to be the final transformation matrix for the last-input color image frame.

9. The system of claim 8, wherein the sub-module for identifying keyframe matching points, comprises using a Speeded Up Robust Features (SURF) matching procedure.

10. The system of claim 8, wherein the sub-module for fusing the third and the fourth transformation matrices to produce a single combined transformation matrix, comprises employing a weighted interpolation procedure.

11. The system of claim 8, wherein the sub-module for estimating the third transformation matrix using the second transformation matrix and the previously-computed keyframe transformation matrix, comprises multiplying the second transformation matrix by the keyframe transformation matrix.

12. The system of claim 8, further comprising:

a depth correcting sub-module that is executed after executing the sub-module for identifying keyframe matching points and prior to executing the sub-module for estimating the second transformation matrix, said depth correcting program sub-module comprising sub-modules for, defining a window around each identified keyframe matching point;

identifying the closest point to the camera within each window; and designating the identified closest point within each window as a keyframe matching point in lieu of the previously identified keyframe matching point associated with the window, a keyframe matching point outlier de-designation sub-module that is executed after executing the sub-module for depth correcting and prior to executing the sub-module for estimating the second transformation matrix, said keyframe matching point outlier de-designation program module comprising de-designating as keyframe matching points each pair of identified keyframe matching points having a matching quality level that falls below a prescribed minimum level, and a second keyframe matching point outlier de-designation sub-module that is executed after executing the sub-module for estimating the second transformation matrix and before executing the sub-module for estimating the third transformation matrix, said second keyframe matching point outlier de-designation sub-module comprising sub-modules for, (a) applying the second transformation matrix to the keyframe matching points identified in the last-input color image frame to ascertain keyframe matching points in the recorded keyframe that depicts at least the prescribed portion of the scene depicted in the last-input color image frame that correspond to keyframe matching points in the last-input color image frame;

(b) for each previously identified keyframe matching point in the recorded keyframe that depicts at least the prescribed portion of the scene depicted in the last-input color image frame, computing a difference measure between the coordinates of the previously identified keyframe matching point and the coordinates of that keyframe matching point ascertained by applying the second transformation matrix to the keyframe matching point in the last-input color image frame that corresponds to the previously identified keyframe matching point in the recorded keyframe that depicts at least the prescribed portion of the scene depicted in the last-input color image frame, (c) computing the average of the difference measures of the remaining keyframe matching point pairs and determining whether the computed average exceeds a prescribed minimum level;

(d) whenever the computed average exceeds a prescribed minimum level,
ordering the difference measures by magnitude and identifying a prescribed percentage of the difference measures starting with the largest and going down in magnitude,
de-designating as keyframe matching points the previously identified keyframe matching point in the recorded keyframe that depicts at least the prescribed portion of the scene depicted in the last-input color image frame and its corresponding keyframe matching point in the last-input color image frame of each keyframe matching point pair associated with one of the identified difference measures,
re-estimating the second transformation matrix using the remaining keyframe matching points;

(e) determining if a prescribed maximum number of transformation matrix re-estimation iterations has been reached; and (f) whenever the prescribed maximum number of transformation matrix re-estimation iterations has not been reached, repeating the execution of sub-modules (a) through (f).

13. The system of claim 8, wherein the sub-module determining whether a keyframe matching is to occur, comprises:
determining whether a prescribed number of frames have been input since the last time keyframe matching was performed,
whenever it is determined that a prescribed number of frames have not been input since the last time keyframe matching was performed, designating that it is not time for keyframe matching to occur, and
whenever it is determined that a prescribed number of frames have been input since the last time keyframe matching was performed, designating that it is time for keyframe matching to occur.

14. The system of claim 1, wherein the final transformation matrix and current head pose location and orientation in the scene are employed in an augmented reality application to position a virtual object in the scene.

15. A system for head pose tracking, comprising:
a group of head pose tracking sensors configured such that all the sensors in the group are disposed on a user's head, said group of sensors comprising a depth sensor apparatus used to identify the three dimensional locations of points within a scene sensed by the group of sensors, a color video camera, and a suite of inertial sensors that measures angular velocity around three axes and linear acceleration along the three axes, said depth sensor apparatus and the color video camera being synchronized so as to periodically produce contemporaneous scene data in the form of a depth frame and a color image frame and calibrated so as to map each pixel in each color image frame to a corresponding three dimensional scene location in the contemporaneously-produced depth frame, and said inertial sensors providing frames of angular velocity and linear acceleration data at a rate equaling or exceeding the rate at which the depth and color image frames are provided;
a computing device; and
a computer program comprising program modules executed by the computing device, wherein the computing device is directed by the program modules of the computer program to,
input each inertial sensors frame produced;
for each inertial sensors frame input after the first,
estimate a current inertial sensor-based transformation matrix using the last-input inertial sensors frame, said transformation matrix defining the translation and rotation of points from the immediately preceding inertial sensors frame input to the last-input inertial sensors frame,
estimate a final inertial sensor-based transformation matrix that defines the translation and rotation of points from the first inertial sensors frame input to the last-input inertial sensors frame by accumulating a previously-computed transformation matrix, which defines the translation and rotation of points from the first inertial sensors frame to the inertial sensors frame input immediately preceding the last-input inertial sensors frame, with the current inertial sensor-based transformation matrix that defines the translation and rotation of points from the immediately preceding inertial sensors frame input to the last-input inertial sensors frame,
determine if new color video and depth frames have been produced,
whenever new color video and depth frames have not been produced, apply the final inertial sensor-based transformation matrix to a previously determined head pose location and orientation associated with the first inertial sensors frame input to identify the current head pose location and orientation,
whenever new color video and depth frames have been produced,
input the new color image and depth frames,
identify matching features between the last-input color image frame and a color image frame produced immediately preceding the last-input color image frame,
estimate a current image-based transformation matrix using the identified matching features and the corresponding three dimensional locations of the matching features in both the last-input color image frame and the color image frame produced immediately preceding the last-input color image frame, said image-based transformation matrix defining the translation and rotation of points to the last-input color image frame from the color image frame produced immediately preceding the last-input color image frame, estimate a final image-based transformation matrix that defines the translation and rotation of points from the first inertial sensors frame input to the last-input color image frame by accumulating a previously-computed transformation matrix, which defines the translation and rotation of points from the first inertial sensors frame to the color image frame input immediately preceding the last-input color image frame, with the current image-based transformation matrix defining the translation and rotation of points to the last-input color image frame from the immediately preceding color image frame, fuse the final image-based transformation matrix and the final inertial sensor-based transformation matrix to produce a single combined transformation matrix that defines the translation and rotation of points from the first inertial sensors frame input to the last-input inertial sensors frame, and apply the combined transformation matrix to a previously determined head pose location and orientation associated with the first inertial sensors frame input to identify the current head pose location and orientation.

16. The system of claim 15, further comprising a keyframe program module that is executed after executing the program module for inputting the new color image and depth frames and before executing the program module for identifying matching features between the last-input color image frame and a color image frame produced immediately preceding the last-input color image frame, said keyframe program module comprising sub-modules for:

determining if a new keyframe is to be established, and
whenever it is determined a new keyframe is to be established, recording the last-input color image frame and designating the recorded frame as a keyframe.

17. The system of claim 16, wherein the sub-module for determining if a new keyframe is to be established, comprises determining that a new keyframe is to be establish whenever the last-input color image frame is the first color image frame input, and whenever the last-input color frame depicts less than a prescribed portion of the scene depicted in the previously-established keyframes.

18. The system of claim 16, wherein the keyframe program module further comprises sub-modules for:

whenever it is determined that a new keyframe is not to be established, determining whether a keyframe matching is to occur;

whenever it is determined that a keyframe matching is to occur, or a new keyframe has been established,
identifying keyframe matching points between the last-input color image frame and a recorded keyframe that depicts at least a prescribed portion of the scene depicted in the last-input color image frame, estimating a second transformation matrix using the identified keyframe matching points and the corresponding three dimensional locations of the keyframe matching features in both the last-input color image frame and the recorded keyframe that depicts at least the prescribed portion of the scene depicted in the last-input color image frame, said second transformation matrix defining the translation and rotation of points from the recorded keyframe that depicts at least the prescribed portion of the scene depicted in the last-input color image frame to the last-input color image frame, estimating a third transformation matrix using the second transformation matrix and a previously-computed keyframe transformation matrix that defines the translation and rotation of points from the first color image frame input to the recorded keyframe that depicts at least the prescribed portion of the scene depicted in the last-input color image frame, said third transformation matrix defining the translation and rotation of points from the first color image frame input to the last-input color image frame, designating the third transformation matrix as a keyframe transformation matrix that defines the translation and rotation of points from the first color image frame input to the newly established keyframe whenever the last-input color image frame is the newly established keyframe, estimating a fourth transformation matrix that defines the translation and rotation of points from the first inertial sensors frame input to the last-input color image frame by accumulating said previously-computed transformation matrix, which defines the translation and rotation of points from the first inertial sensors frame to the color image frame input immediately preceding the last-input color image frame, with the current image-based transformation matrix defining the translation and rotation of points to the last-input color image frame from the immediately preceding color image frame, fusing the third and the fourth transformation matrices to produce a single combined image-based transformation matrix that defines the translation and rotation of points from the first inertial sensors frame input to the last-input color image frame, and designating the combined image-based transformation matrix to be said final image-based transformation matrix.

19. The system of claim 15, wherein the inertial sensor-based transformation matrix and current head pose location and orientation in the scene are employed in an augmented reality application to position a virtual object in the scene whenever new color video and depth frames have not been produced, and the combined transformation matrix and current head pose location and orientation in the scene are employed in the augmented reality application to position a virtual object in the scene whenever new color video and depth frames have been produced.

* * * * *